United States Patent
Oho et al.

(10) Patent No.: US 7,571,488 B2
(45) Date of Patent: Aug. 4, 2009

(54) RIGHTS MANAGEMENT TERMINAL, SERVER APPARATUS AND USAGE INFORMATION COLLECTION SYSTEM

(75) Inventors: Masahiro Oho, Katano (JP); Ryuichi Okamoto, Kadoma (JP); Mitsuhiro Inoue, Osaka (JP); Hiroki Murakami, Suita (JP); Katsumi Tokuda, Ikeda (JP)

(73) Assignee: Panasonic Corporation, Osaka (JP)

( * ) Notice: Subject to any disclaimer, the term of this patent is extended or adjusted under 35 U.S.C. 154(b) by 919 days.

(21) Appl. No.: 11/093,116

(22) Filed: Mar. 30, 2005

(65) Prior Publication Data

US 2005/0223415 A1    Oct. 6, 2005

(30) Foreign Application Priority Data

Mar. 31, 2004    (JP)    ............................. 2004-106341

(51) Int. Cl.
*H04L 9/14* (2006.01)
(52) U.S. Cl. .............................. 726/27; 705/51; 705/59
(58) Field of Classification Search .................... 726/27
See application file for complete search history.

(56) References Cited

U.S. PATENT DOCUMENTS

| | | | |
|---|---|---|---|
| 6,820,063 B1 * | 11/2004 | England et al. ................ | 705/54 |
| 7,185,195 B2 * | 2/2007 | Hug et al. ..................... | 713/156 |
| 7,370,212 B2 * | 5/2008 | Bourne et al. ................ | 713/193 |
| 2002/0004900 A1 * | 1/2002 | Patel ........................... | 713/155 |
| 2002/0038291 A1 * | 3/2002 | Petersen et al. ............... | 705/67 |
| 2003/0126211 A1 * | 7/2003 | Anttila et al. ................ | 709/205 |
| 2004/0064701 A1 * | 4/2004 | O'Donoghue ................ | 713/175 |
| 2004/0158712 A1 * | 8/2004 | Lee et al. ..................... | 713/165 |

FOREIGN PATENT DOCUMENTS

| JP | 2002/522995 | 7/2002 |
|---|---|---|
| WO | 00/08909 | 2/2000 |

* cited by examiner

*Primary Examiner*—Matthew B Smithers
(74) *Attorney, Agent, or Firm*—Wenderoth, Lind & Ponack, L.L.P.

(57) ABSTRACT

The present invention provides a rights management terminal that can securely send and receive usage information while preventing spoofing and protecting user's privacy. The rights management terminal manages a copyright of a content using a license that includes a usage rule of the content, and includes: a first public key certificate management unit which manages, as a set, a first public key certificate that includes identification information for uniquely identifying at least one of the rights management terminal and a user using the terminal, and a first private key paired with a first public key included in the first public key certificate; a second public key certificate management unit which manages, as a set, a second public key certificate that does not include the identification information, and a second private key paired with a second public key included in the second public key certificate; a selection processing unit that selects, as a set, one of the following: the first public key certificate and the first private key; and the second public key certificate and the second private key; and an authentication processing unit that executes authentication for communicating with a server apparatus, using the public key and the private key that are selected as a set by the selection processing unit.

20 Claims, 29 Drawing Sheets

FIG. 9

Display screen of license list

List of recommended licenses for this week    1/10 page

| Genre | Name of license | Validated period | Condition for replay | |
|---|---|---|---|---|
| Drama | Black Tower (last episode) | 1 day | None | Purchase |
| | The Freshers (10 episodes) | None | 45 minutes | Purchase |
| Sport | soccer (Japan vs UAE) | None | once | Purchase |
| | baseball (Daiei vs Giants) | None | once | Purchase |
| Movie | The Olympic | 1 month | once | Purchase |

(to the next page)

901

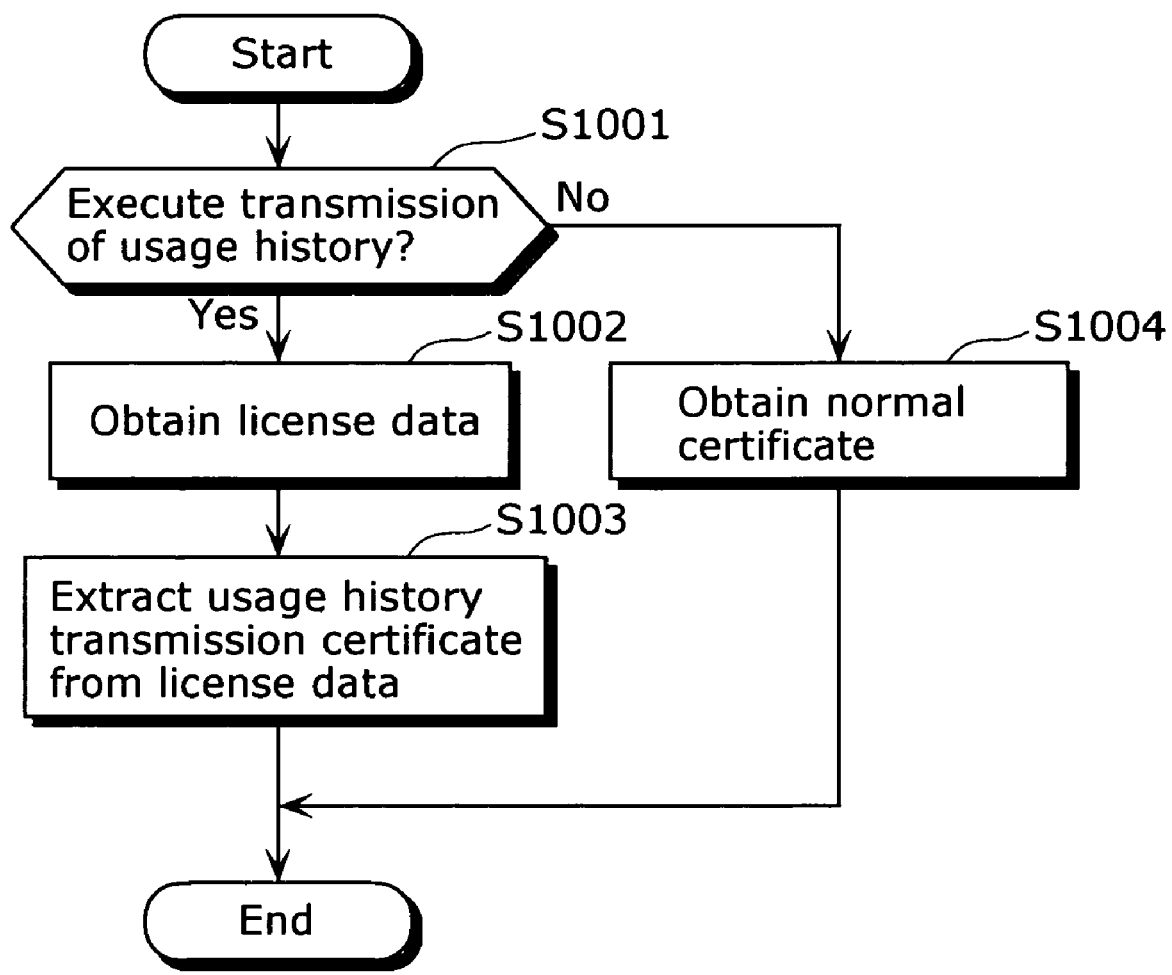

FIG. 11

Data structure of normal public key certificate

| Object | Value |
|---|---|
| Version | 02 |
| Serial number | 0C000001 |
| Issuer | Certificate Authority |
| Validated period | from 01/01/04 to 31/12/06 |
| Public key | Public key data |
| Signature ||

Client ID of rights management terminal 211

Data structure of license before insertion of public key certificate and private key

FIG. 15

Data structure of usage history transmission certificate

| Object | Value |
|---|---|
| Version | 02 |
| Serial number | 0A000001 |
| Issuer | Certificate Authority |
| Validated period | from 01/01/04 to 31/12/06 |
| Public key | Public key data |
| Signature | |

Set license ID as client ID for anonymous use (← Serial number)

Data structure of license after insertion of public key certificate and private key Data structure of usage history transmission trigger data Data structure of encrypted content that includes certificate key Attribute certificate (a)

FIG. 27A

| Age | teenage |
|---|---|
| Sex | female |
| ⋮ | ⋮ |

Attribute certificate (b)

FIG. 27B

| Age | twenties |
|---|---|
| Sex | female |
| ⋮ | ⋮ |

User profile

FIG. 27C

| Age | twenties |
|---|---|
| Sex | female |
| ⋮ | ⋮ |

FIG. 29A Distribution of questionnaire
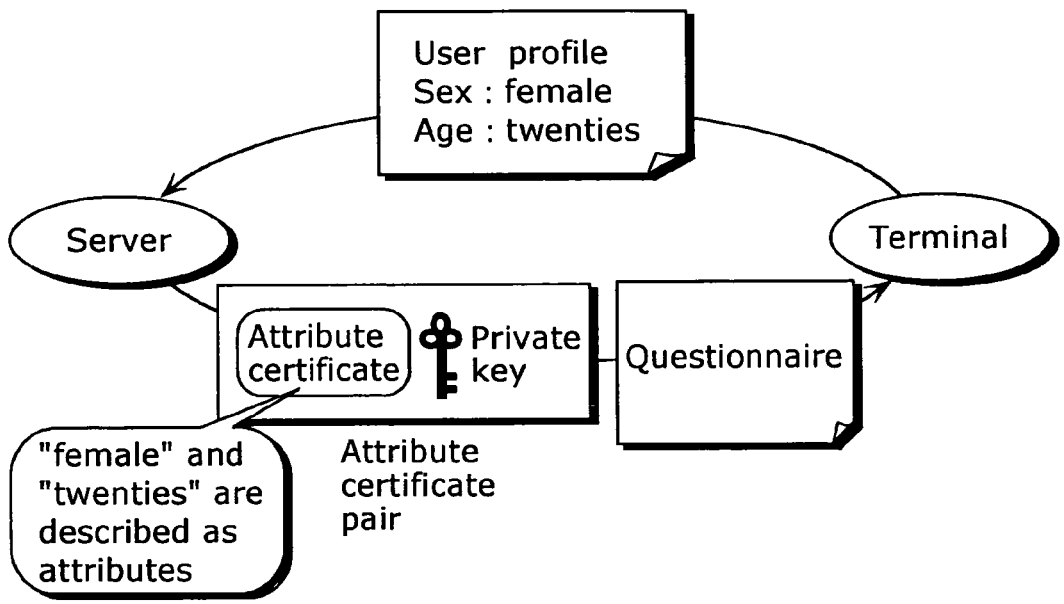
FIG. 29B Collection of questionnaire
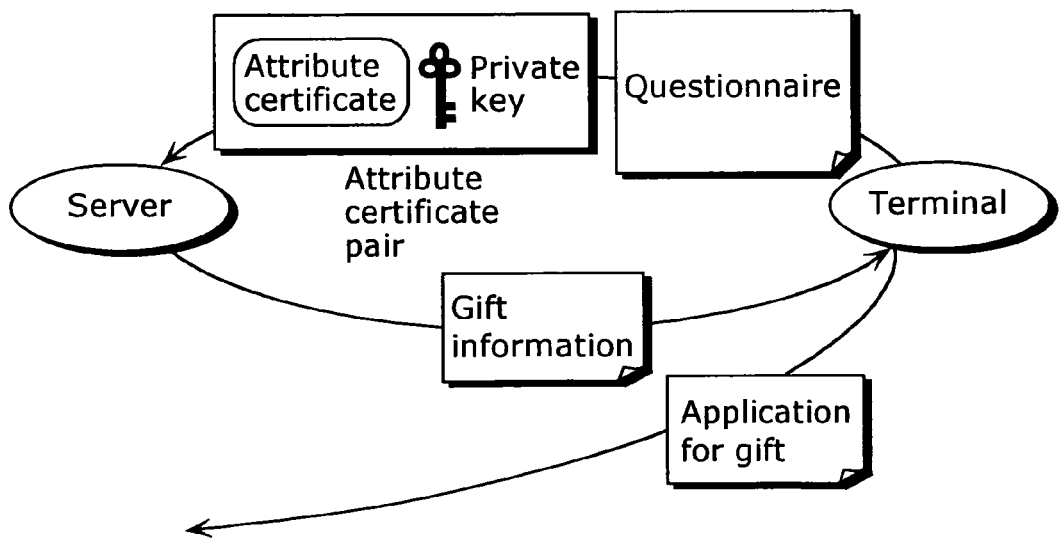

RIGHTS MANAGEMENT TERMINAL, SERVER APPARATUS AND USAGE INFORMATION COLLECTION SYSTEM

BACKGROUND OF THE INVENTION (1) Field of the Invention

The present invention relates to a rights management terminal, a server apparatus and a usage information collection system, and in particular, to a technique of collecting usage information (e.g. a usage history of a digital content used by a terminal apparatus) that is anonymously sent, while preventing spoofing.

(2) Description of the Related Art

Recently, content distribution services under which a server apparatus (hereinafter to be referred to as "server") distributes a digital content (hereinafter to be referred to as "content") such as movie and music to a terminal apparatus (hereinafter to be referred to as "terminal" or "rights management terminal") by which the content is used have entered a phase of practical application. The development of digital devices has made it easier to enact an unauthorized copy of a content, which causes an increase in the number of problems that a copyright of the content is infringed. This is why a technique of Digital Rights Management (DRM) is used in the content distribution system in order to prevent an unauthorized use of a content. The DRM is a technique for providing a secure license only to an authorized user or terminal apparatus, and authorizing a use of a content under the usage rules indicated in the license. The DRM applies an authentication technique or an encryption technique that uses the following: a public key certificate (hereinafter to be referred to as "normal certificate") that includes identification information for uniquely identifying at least one of a terminal and a user who uses the terminal; and a private key paired with a public key included in the public key certificate.

According to the Japanese Laid-Open Patent Application No. 2002-522995, an example of a usage history collection system, in which a usage history of a content used by a terminal apparatus is previously stored and the usage history is regularly transmitted to a server apparatus, with the view to conduct a rating survey for each of the contents distributed as a content distribution service, is illustrated.

In order that the server apparatus may properly conduct a rating survey, it is required that the server apparatus accepts only usage histories sent by authorized terminal apparatuses and excludes those sent by unauthorized terminal apparatuses such as an apparatus that attempts spoofing. This can be solved, as in the case of distributing a license to a terminal apparatus, by receiving a usage history after verifying a validity of the terminal apparatus from which the usage history is to be transmitted, using the authentication technique with the use of normal certificate.

However, receiving a usage history after the terminal authentication may cause a problem of privacy since identification information is revealed based on a normal certificate and the terminal or the user can be identified.

Such problem can be caused not only in the case of collecting usage histories but also in the case of collecting usage information in general, regarding user's content usage, such as questionnaires inquiring about usage of content.

SUMMARY OF THE INVENTION

The present invention therefore is conceived in view of the above problem, and an object of the present invention is to provide a rights management terminal that can securely send and receive usage information.

In order to achieve the above object, a rights management terminal according to the present invention manages a copyright of a content using a license that includes a usage rule of the content, and includes: a first certificate management unit operable to manage, as a set, a first public key certificate and a first private key, the first public key certificate including identification information that uniquely identifies at least one of said rights management terminal and a user using said terminal, and the first private key being paired with a first public key included in the first public key certificate; a second certificate management unit operable to manage, as a set, a second public key certificate and a second private key, the second public key certificate not including the identification information, the second private key being paired with a second public key included in the second public key certificate; a selection processing unit operable to select, as a set, one of the following: the first public key certificate and the first private key; and the second public key certificate and the second private key; and an authentication processing unit operable to execute authentication for communicating with a server apparatus, using the public key certificate and the private key which are selected as a set by the selection processing unit.

Thus, it is possible to securely send and receive usage information while protecting user's privacy and preventing spoofing.

The selection processing unit may select, as a set, a public key certificate and a private key to be used for authentication, according to a type of execution command used during the communication with the server apparatus.

The selection processing unit may (i) select, as a set, the second public key certificate and the second private key in the case where the execution command indicates a transmission of usage information related to a usage of the content used by the user, and (ii) select, as a set, the first public key certificate and the first private key in other cases.

The usage information may be a usage history of the content, and the selection processing unit may select, as a set, the second public key certificate and the second private key in the case where the execution command indicates a transmission of the usage history to the server apparatus.

The selection processing unit may select, as a set, the second public key certificate and the second private key in the case where the user using the rights management terminal sends the execution command for transmitting the usage history to the server apparatus.

The selection processing unit may select, as a set, the second public key certificate and the second private key in the case where the server apparatus sends the execution command for transmitting the usage history to the server apparatus.

The rights management terminal may further include a usage history management unit operable to manage the usage history, wherein the usage history management unit may delete the usage history to be managed, in the case where the usage history is transmitted to the server apparatus.

The usage information may be a questionnaire related to the usage of the content, and the selection processing unit may select, as a set, the second public key certificate and the second private key in the case where the execution command indicates a transmission of the questionnaire to the server apparatus.

The second certificate management unit may previously hold, as a set, the second public key certificate and the second private key before the management.

The second certificate management unit may manage, as a set, the second public key certificate transmitted from the server apparatus, and the second private key, in the case where the user using the rights management terminal subscribes to a service provided under a rights management system.

The second public key certificate and the second private key may be included in the license, the second certificate management unit may manage, as a set, the second public key certificate and the second private key, together with the license, and in the case where the second public key certificate and the second private key are required as a set, the selection processing unit may obtain the second public key certificate and the second private key from the license.

The second public key certificate and the second private key may be included in the content, the second certificate management unit may manage, as a set, the second public key certificate and the second private key, together with the content, and in the case where the second public key certificate and the second private key are required as a set, the selection processing unit may obtain, as a set, the second public key certificate and the second private key.

The second public key certificate and the second private key may be included in metadata that indicates an outline of the content or the license, the second certificate management unit is operable to manage, as a set, the second public key certificate and the second private key, together with the metadata, and in the case where the second public key certificate and the second private key are required as a set, the selection processing unit may obtain the second public key certificate and the second private key from the metadata.

The second public key certificate and the second private key may be included in broadcast waves, the rights management terminal may further include a certificate-in-broadcast-waves obtainment unit operable to obtain the second public key certificate and the second private key from the broadcast waves, and the second certificate management unit may manage, as a set, the second public key certificate and the second private key which are obtained by said certificate-in-broadcast-waves obtainment unit.

A pair of the second public key certificate and the second private key may be a pair of an attribute certificate and a third private key, the attribute certificate certifying an attribute of the user using the rights management terminal, and the third private key being paired with a third public key included in the attribute certificate, and in the case where the second public key certificate and the second private key are required as a set, the selection processing unit may obtain a pair of the attribute certificate and the third private key.

A pair of the second public key certificate and the second private key may be made up of a bunch of pairs, each being made up of the attribute certificate and the third private key, the attribute certificate holding an attribute different from an attribute held by another attribute certificate, and the third private key being paired with the attribute certificate, the rights management terminal may further include a user profile management unit operable to manage a profile of the user using said rights management terminal, and in the case where the second public key certificate and the second private key are required as a set, the selection processing unit may obtain, from the bunch of pairs, a pair of the attribute certificate and the third private key, the attribute certificate holding an attribute that corresponds to an attribute indicated in the profile.

The second certificate management unit may manage a pair of the attribute certificate and the third private key as the second public key certificate and the second private key respectively, the attribute certificate holding a predetermined attribute transmitted from the server apparatus, and the selection processing unit may obtain a pair of the attribute certificate and the third private key, the attribute certificate holding the predetermined attribute and being managed by the second certificate management unit.

In order to achieve the above object, a server apparatus according to the present invention handles a license required by a rights management terminal using a content, and includes an authentication unit operable to authenticate the rights management terminal, using a public key certificate received from the rights management terminal for starting a data communication with the terminal, wherein in the case where a second public key certificate is received from the rights management terminal, the authentication unit is operable to authenticate the rights management terminal by using the second public key certificate as an anonymous certificate, the second public key not including identification information that uniquely identifies one of the rights management terminal and a user using the terminal.

Thus, it is possible to securely send and receive usage information while protecting user's privacy and preventing spoofing the server apparatus may further include a certificate pair transmission unit operable to transmit, to the rights management terminal, a set of the second public key certificate and a second private key paired with a second public key included in the second public key certificate, wherein in the case where the second public key certificate transmitted from the certificate pair transmission unit corresponds to the second public key certificate transmitted from the rights management terminal, the authentication unit may authenticate that the rights management terminal is a valid terminal.

The server apparatus may further include a usage information collection unit operable to collect a usage history transmitted from the rights management terminal that is authenticated as a valid terminal.

Note that the present invention can be realized not only as the rights management terminal and the server apparatus as described above, but also as a usage information collection system consisting of such rights management terminal and server apparatus, and a rights management method that includes, as steps, the characteristic units included in the rights management terminal and the server apparatus, and even as a program that causes a computer to execute these steps. Such program can be surely distributed via a storage medium such as a CD-ROM or a transmission medium such as the Internet.

As is obvious from the above description, according to the present invention, in the case of transmitting usage information such as a usage history and a questionnaire, a public key certificate and a private key are selected for anonymous use so that authentication is performed using them. It is therefore possible to collect usage information based on the verification that the usage information is transmitted from an authorized terminal apparatus, but without identifying the terminal apparatus.

Therefore, a practical value of the present invention is very high today where content distribution services are actually provided and a great importance is attached to the protection of privacy.

FURTHER INFORMATION ABOUT TECHNICAL
BACKGROUND TO THIS APPLICATION

The disclosure of Japanese Patent Application No. 2004-106341, filed on Mar. 31, 2004, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a diagram showing a screen on which a list of licenses is displayed by a rights management terminal 211;

FIG. 10 is a flowchart showing a subroutine performed in a processing (S805) of selecting a certificate shown in FIG. 8;

FIG. 11 shows a data structure of a normal public key certificate (i.e. a normal certificate) managed by a terminal DB 2119;

FIG. 15 shows a data structure of a public key certificate (i.e. an anonymous certificate) for transmission of usage history;

FIGS. 27A to 27C respectively show an example of the attribute certificate and the user profile shown in FIG. 26;

FIGS. 29A and 29B respectively show an exchange of a user profile, an attribute certificate pair and a questionnaire performed between a terminal and a server according to a fourth embodiment of the present invention.

DESCRIPTION OF THE PREFERRED EMBODIMENTS

The following describes in detail the embodiments of the present invention with reference to the diagrams.

First Embodiment (Description of System Configuration)

Figure 1:
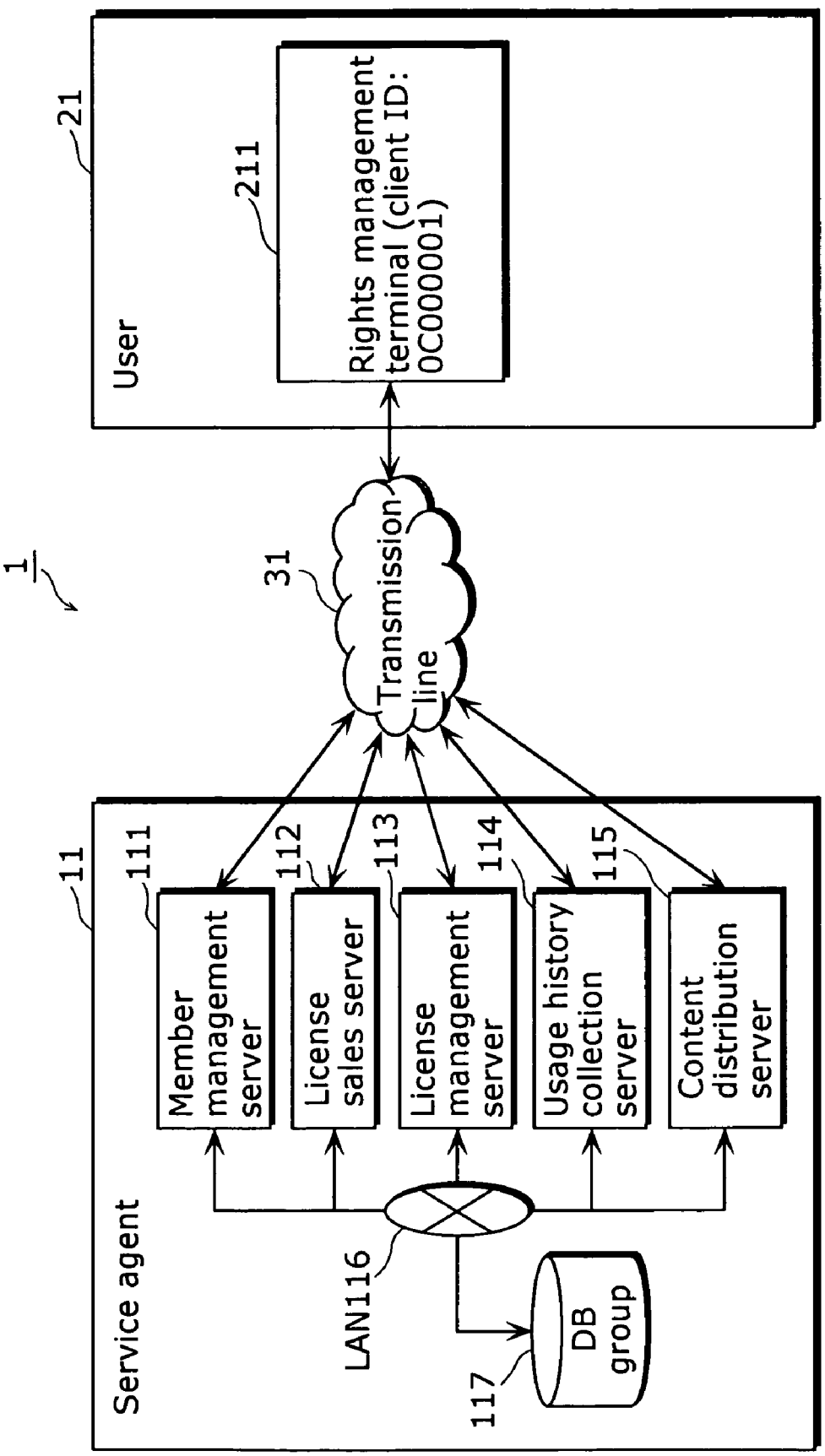
FIG. 1 is a diagram showing a configuration of a usage history collection system according to a first embodiment of the present invention.

FIG. 1 is a diagram showing a configuration of a usage history collection system according to the first embodiment of the present invention.

As shown in FIG. 1, the present usage history collection system 1 is comprised of: a member management server 111 used by a service provider 11; a license sales server 112; a license management server 113; a usage history collection server 114; a content distribution server 115; a LAN 116; a database (hereinafter to be referred to as "DB") group 117; a rights management terminal (hereinafter to be referred to as "terminal" or "terminal apparatus") 211 used by a user 21; and a transmission line 31 which connects each server operated by the service provider 11 and the rights management terminal 211 operated by the user 21, or which is wireless.

Here, the member management server 111, a server that receives an entry to subscribe the content distribution service provided by the service provider 11, receives a request for entry from the rights management terminal 211, and proceeds with the procedures required for the subscription.

The license sales server 112, a server that sells a license necessary for using a content, receives a request for purchase of license from the rights management terminal 211, and proceeds with the procedures required for the purchase.

The license management server 113, a server that issues a license purchased by the user, receives a license issuance request from the rights management terminal 211, and issues a license that corresponds to the license indicated in the request. Note that in the present embodiment, the license management server 113 also distributes, to the rights management terminal 211, a license which includes: a public key certificate (i.e. an anonymous certificate) to be used for transmission of usage history from the rights management terminal 211 to the usage history collection server 114; and a private key paired with a public key included in the anonymous certificate.

The usage history collection server 114, a server that collects a history of a content used by the user, receives, from the rights management terminal 211, stores a usage history that is transmitted upon receiving a request for transmission of usage history.

The content distribution server 115 distributes an encrypted content to the rights management terminal 211.

The LAN 116 is a local area network that connects the member management server 111, the license sales server 112, the license management server 113, the usage history collection server 114, the content distribution server 115 and the DB group 117.

The DB group 117 is a generic name for a DB that manages member information, a DB that manages license information, and a DB that manages content information, among others.

The rights management terminal 211 is a terminal apparatus that has the following functions: to obtain a license and a content from the license management server 113 and the content distribution server 115; to control content usage according to rules for using a license; and to generate a content usage history and transmit it to the server. The rights management terminal 211 holds a client ID "0C000001" as an identifier for uniquely self-identifying.

Lastly, the transmission line 31 may be a communication medium such as an Asymmetric Digital Subscriber Line (ADSL) and a Fiber To The Home (FTTH), or a physical medium such as a Digital Versatile Disc (DVD) and a Compact Disc (CD).

The following mainly focuses on module structures of the license management server 113, the usage history collection server 114 and the rights management terminal 211, as well as a sequence of processing performed among them.

Figure 2:
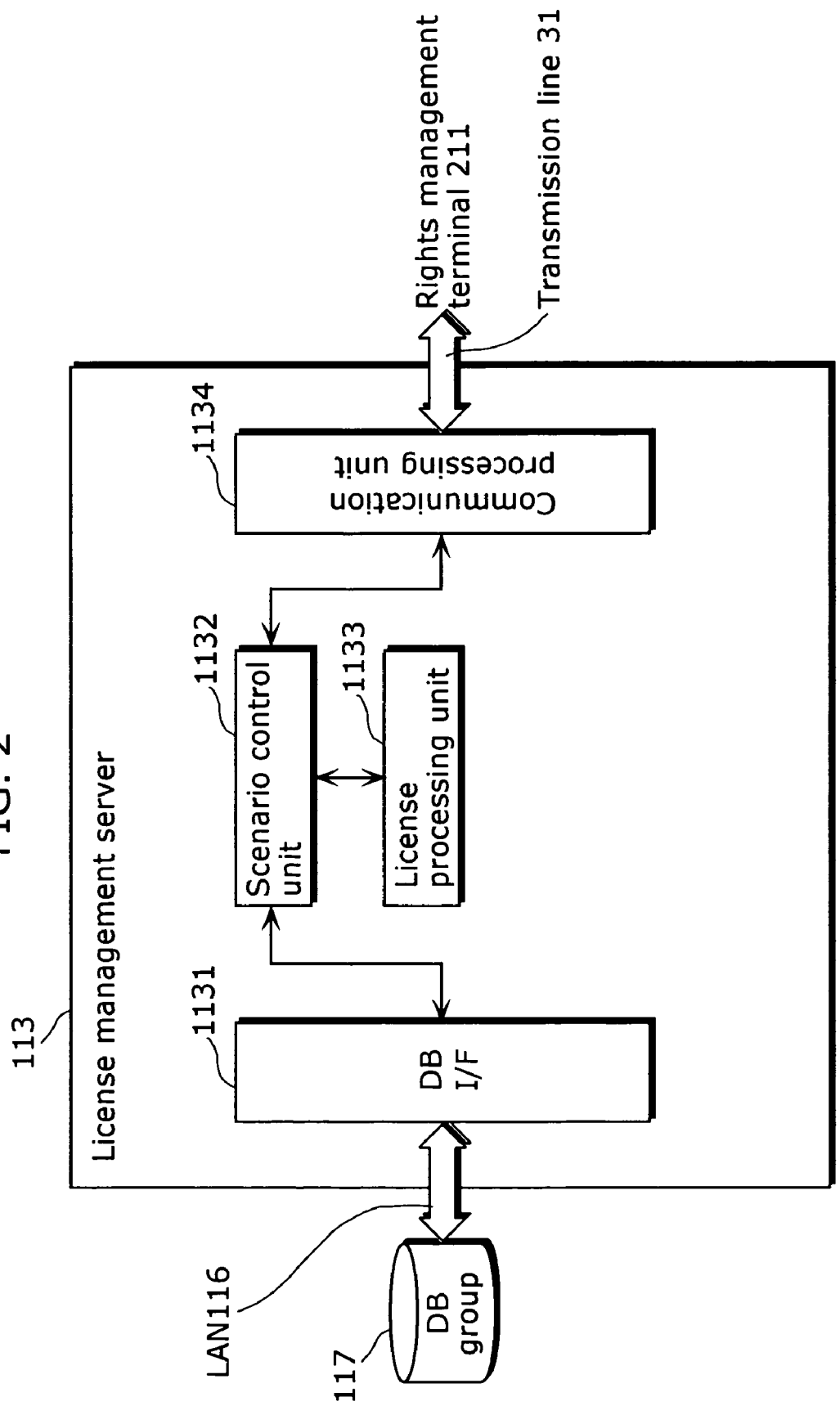
FIG. 2 is a diagram showing a module structure of a license management server 113 shown in FIG. 1.

FIG. 2 is a diagram showing a module structure of the license management server 113.

As shown in FIG. 2, the license management server 113 includes a DB I/F 1131, a scenario control unit 1132, a license processing unit 1133 and a communication processing unit 1134.

Here, the DB I/F 1131 is a module that performs data manipulation (search, registration, and deletion, and others, of data) to each DB in the DB group 117.

The scenario control unit 1132 is a module that controls scenario in response to the request received by the communication processing unit 1134.

The license processing unit 1133 is a module that inserts, into a license, the following: a public key certificate (i.e. an anonymous certificate) to be used for a signature signed by the license management server 113 and for a transmission of usage history; and a private key that is paired with a public key included in the certificate.

Lastly, the communication processing unit 1134 is a module that receives a license issuance request from the rights management terminal 211, and sends back a license issuance response that includes the requested license.

Note that each module of the license management server 113 may be structured as hardware, or may include, as components, a ROM that stores a program, a CPU that executes the program, and a RAM that provides a work area for executing the program.

(Module Structure of Usage History Collection Server 114)

Figure 3:
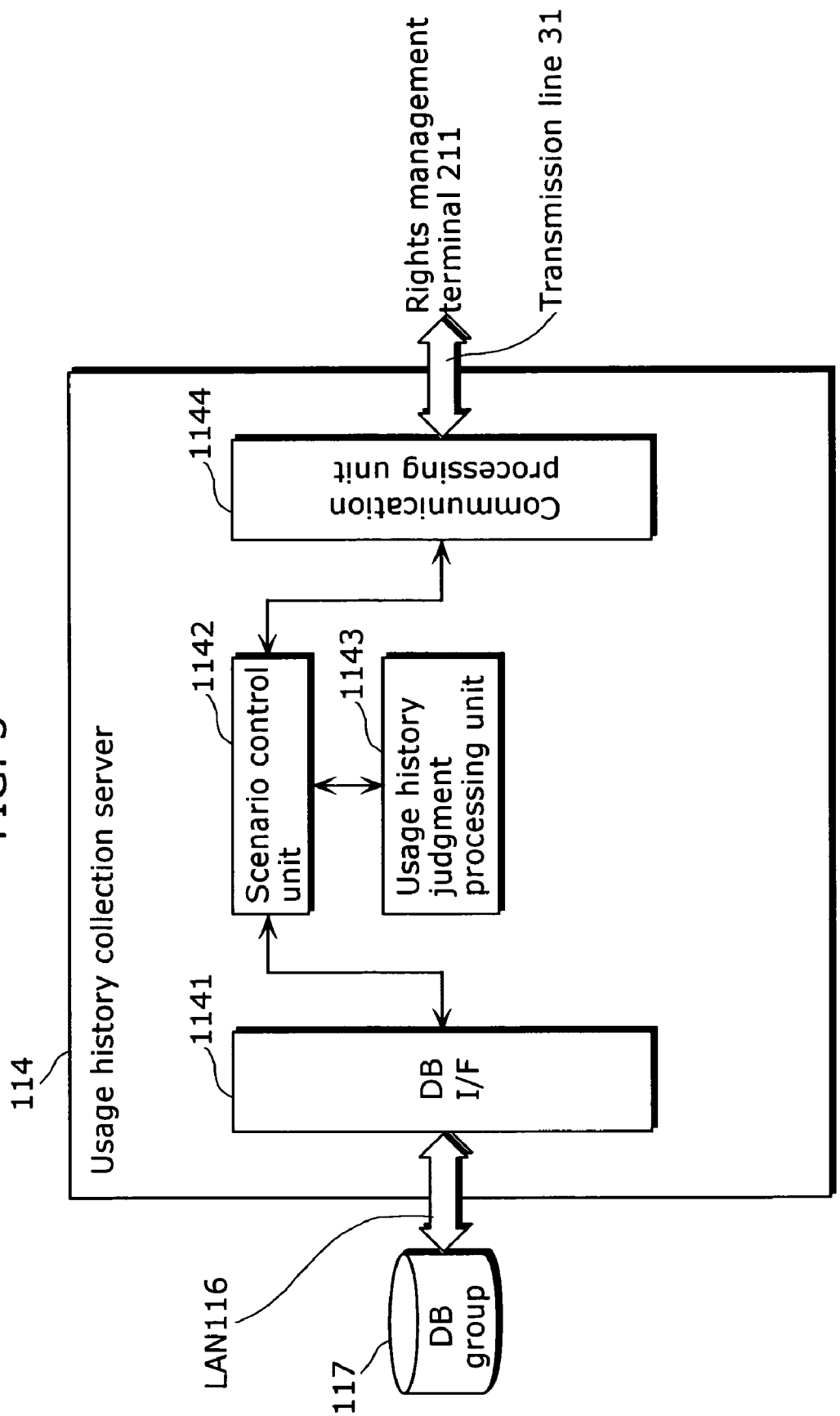
FIG. 3 is a diagram showing a module structure of a usage history collection server 114 shown in FIG. 1.

FIG. 3 is a diagram showing a module structure of the usage history collection server 114.

As shown in FIG. 3, the usage history collection server 114 includes a DB I/F 1141, a scenario control unit 1142, a usage history judgment processing unit 1143 and a communication processing unit 1144.

Here, the DB I/F 1141 is a module that performs data manipulation to each DB in the DB group 117.

The scenario control unit 1142 is a module that controls scenario in response to the request received by the communication processing unit 1144.

The usage history judgment processing unit 1143 is a module which judges whether or not the public key certificate (i.e. an anonymous certificate) used by the rights management terminal 211 for terminal authentication matches with the public key certificate that is held in the DB group 117 and that corresponds to the transmitted usage history. The usage history judgment processing unit 1143 is also a module which forms a SAC.

The communication processing unit 1144 is a module that receives a usage history transmission request from the rights management terminal 211, and sends back a usage history transmission response that includes a result of processing.

Note that each module of the usage history collection server 114 may be structured as hardware, or may include, as components, a ROM that stores a program, a CPU that executes the program, and a RAM that provides a work area for executing the program.

(Structure of DB Group 117)

Figure 4:
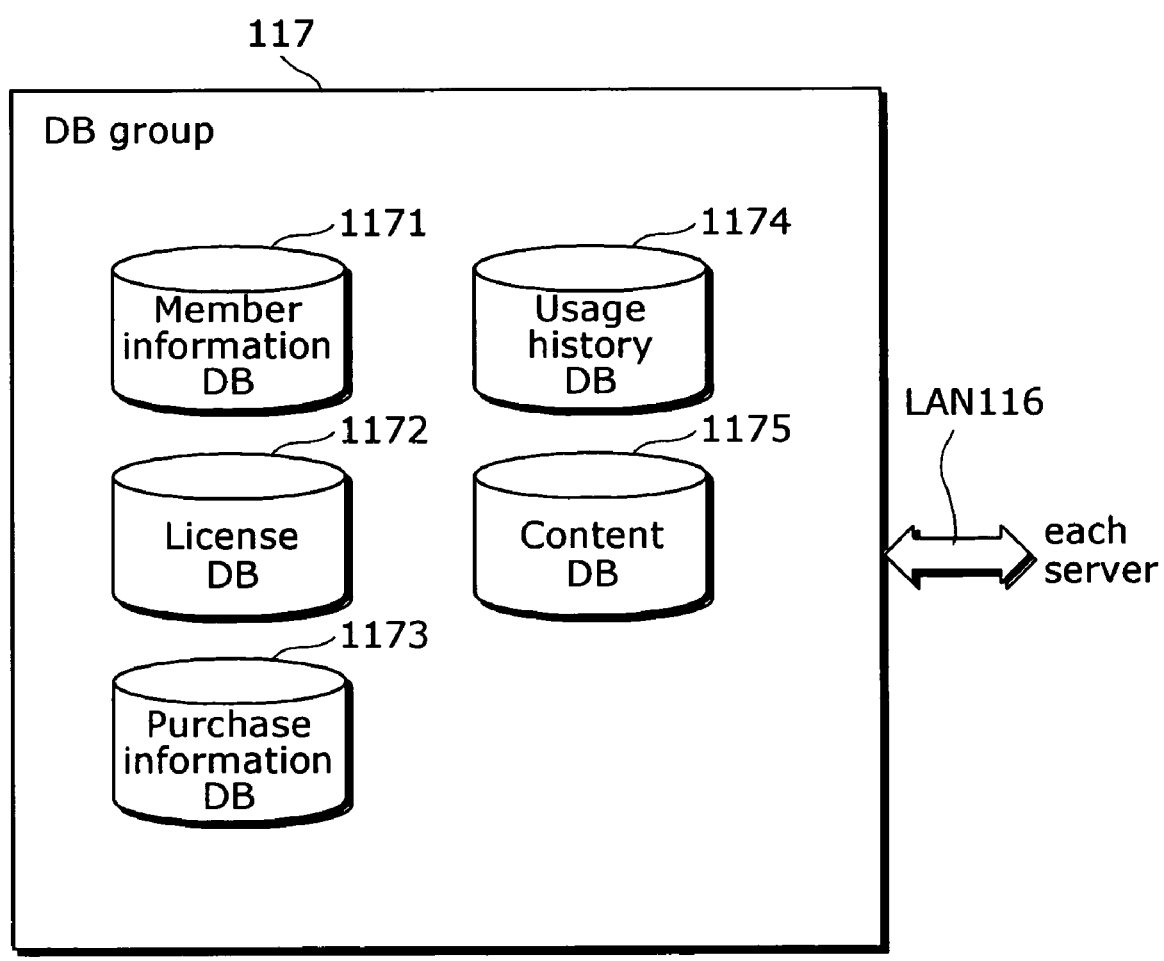
FIG. 4 is a diagram showing a structure of a DB group 117 shown in FIG. 1.

FIG. 4 is a diagram showing a structure of a DB group 117.

As shown in FIG. 4, the DB group 117 includes a member information DB 1171, a license DB 1172, a purchase information DB 1173, a usage history DB 1174 and a content DB 1175.

Here, the member information DB 1171 is a DB that manages user information such as name, age and address of a member user who has subscribed to the service.

The license DB 1172 is a DB that manages meta information (e.g. a number of reproductions and a period of reproduction) for explaining about various types of licenses which are on sale as well as the details of the license, and information of a public key certificate to be used for transmission of usage history, as well as of a private key.

The purchase information DB 1173 is a DB that manages information of the license purchased by the user.

The usage history DB 1174 is a DB that manages the usage history transmitted from the rights management terminal 211.

The content DB 1175 is a DB that manages an encrypted content and meta information (e.g. a title and a name of artist) that describes the detail of the content.

The following describes the structures of the tables held in the member information DB 1171 and the license DB 1172 that are necessary for explaining the present invention.

(Structure of Table in Member Information DB 1171)

Figure 5:
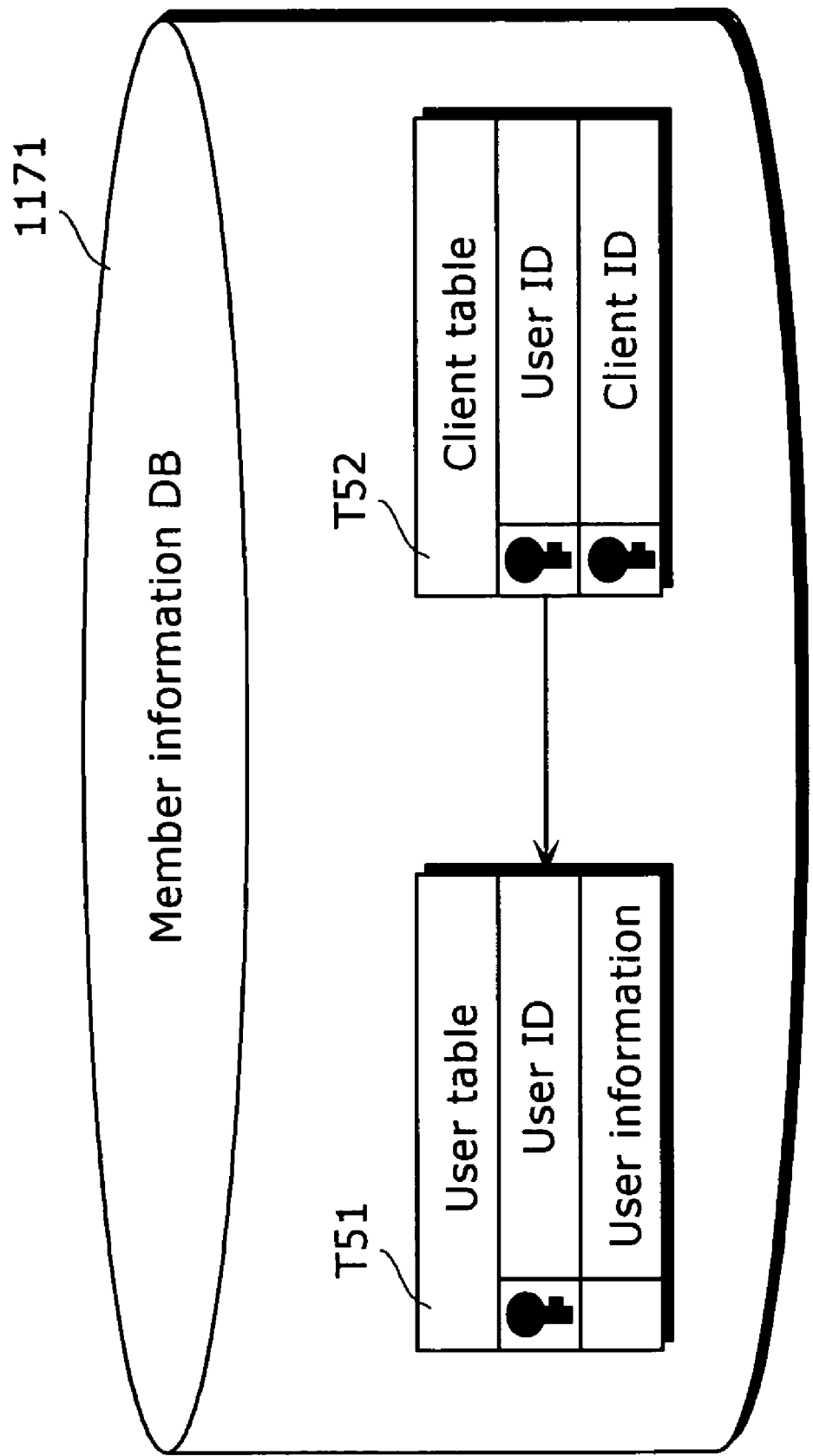
FIG. 5 is a diagram showing structures of tables in a member information DB 1171 shown in FIG. 4.

FIG. 5 a diagram showing structures of tables in a member information DB 1171.

As shown in FIG. 5, the member information DB 1171 includes a user table T51 and a client table T52.

In the user table T51, a user ID for uniquely identifying a member user and user's information such as name, age and address that is associated with the user ID are managed.

In the client table T52, a client ID for uniquely identifying the rights management terminal 211 used by the user is associated with a user ID for management. Thus, the member information DB 1171 is characteristic in that a user ID can be searched out based on a client ID, and user's information can be searched out based on a user ID.

(Structure of Table in License DB 1172)

Figure 6:
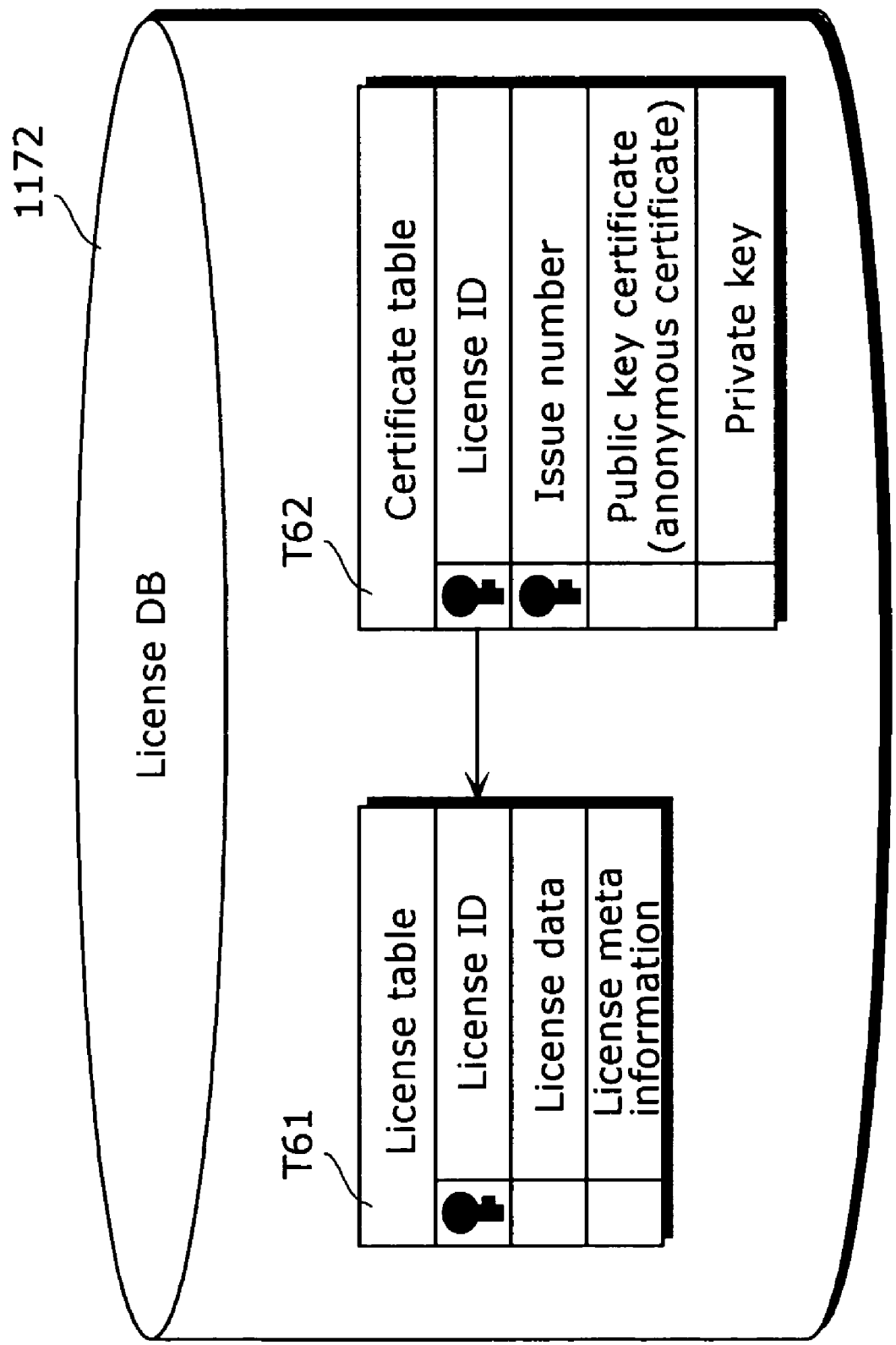
FIG. 6 is a diagram showing structures of tables in a license DB 1172 shown in FIG. 4.

FIG. 6 is a diagram showing structures of tables in a license DB 1172.

As shown in FIG. 6, the license DB 1172 includes a license table T61 and a certificate table T62.

In the license table T61, a license ID for uniquely identifying a license, and license data as well as license meta information that indicates the detail of the license that is associated with the license ID are managed.

In the certificate table T62, a license ID and information such as issue number, public key certificate (i.e. anonymous certificate) and private key paired with a public key included in the anonymous certificate are managed in association with the license ID. Thus, the license DB 1172 is characteristic in that it manages, for each license, information such as a public key certificate to be used for transmission of usage history and a private key.

(Module Structure of Rights Management Terminal 211)

Figure 7:
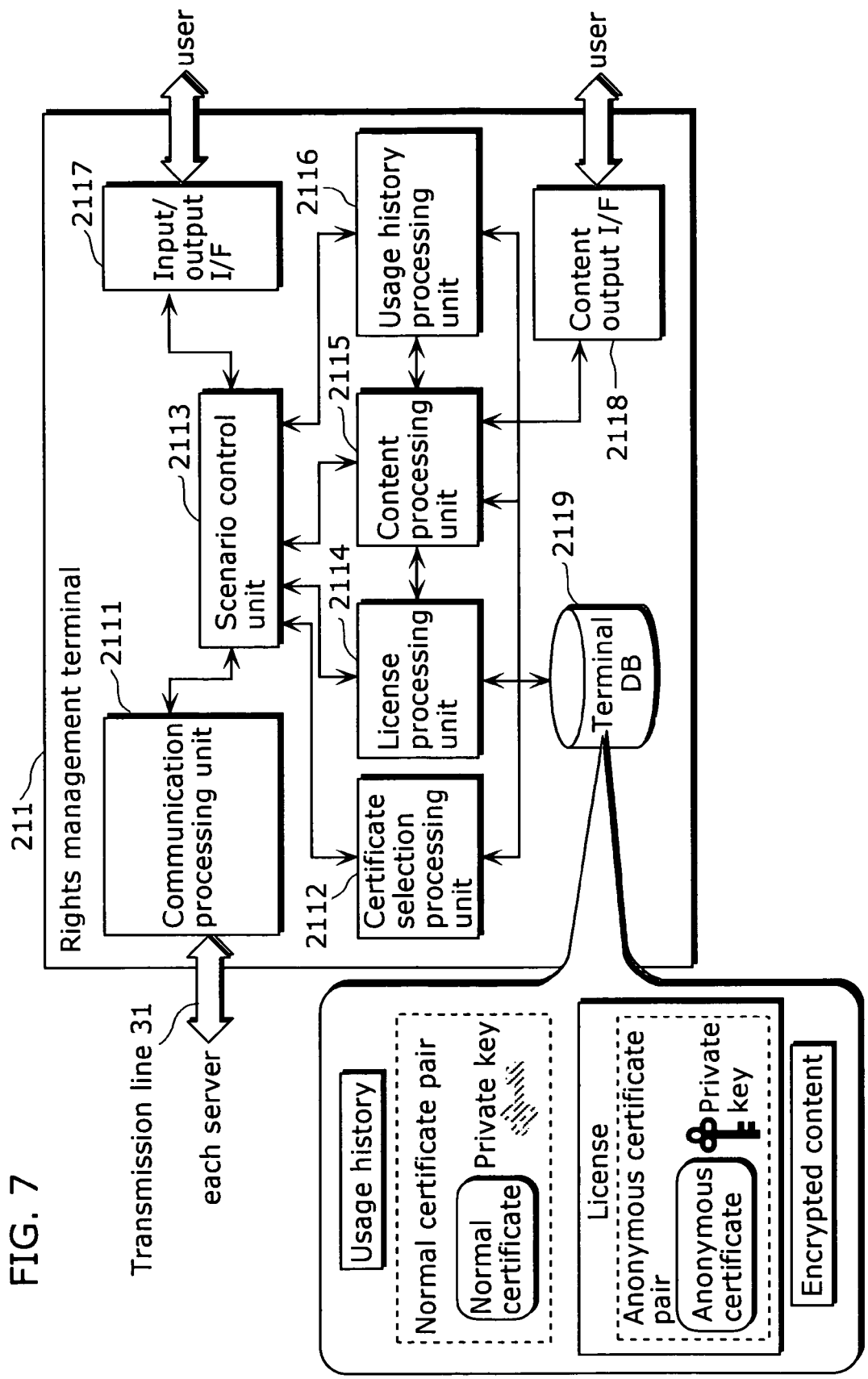
FIG. 7 is a diagram showing a module structure of a rights management terminal 211 shown in FIG. 1.

FIG. 7 is a diagram showing a module structure of the rights management terminal 211.

As shown in FIG. 7, the rights management terminal 211 includes a communication processing unit 2111, a certificate selection processing unit 2112, a scenario control unit 2113, a license processing unit 2114, a content processing unit 2115, a usage history processing unit 2116, an input/output I/F 2117, a content output I/F 2118 and a terminal DB 2119.

Here, the communication processing unit 2111 is a module that communicates with each server according to an instruction from the scenario control unit 2113.

The certificate selection processing unit 2112 is a module that selects a public key certificate to be used for authentication of each server as well as a private key, according to an execution command that is transmitted from the scenario control unit 2113 for communicating with an exterior apparatus (i.e. each server).

The scenario control unit 2113 is a module that controls execution of a scenario in response to the user's request received by the input/output I/F 2117.

The license processing unit 2114 is a module that is in charge of processing related to license such as interpretation of usage rules included in a license and obtainment of a content key for decrypting an encrypted content.

The content processing unit 2115 is a module that performs decryption of an encrypted content and provides the content output I/F 2118 with a content that is not encrypted.

The usage history processing unit 2116 is a module that generates a usage history according to a report on content usage sent by the content processing unit 2115.

The input/output I/F 2117 is a module that plays a role of an input interface for receiving a user's request, and a role of an output interface for displaying a result to the user.

The content output I/F 2118 plays a role of an output interface for presenting a content to the user.

Lastly, the terminal DB 2119 is a DB that stores an encrypted content obtained from each server, license, public key certificate and private key that are to be used for authentication of each server, and a content usage history.

Note that each module of the rights management terminal 211 may be structured as hardware, or may include, as components, a ROM that stores a program, a CPU that executes the program, and a RAM that provides a work area for executing the program.

(Sequence, Flowchart and Data Structure)

Next, a sequence of issuing a license and a sequence of transmitting a usage history are described with reference to FIGS. 8 to 18, in which a flowchart showing a processing related to the present invention is described. Data structures of a license and a public key certificate are described as well.

(Sequence of Issuing a License)

Firstly, a sequence (i.e. a license issuance sequence) in which the user operates the rights management terminal 211 so as to purchase a license and obtain the license is described.

Figure 8:
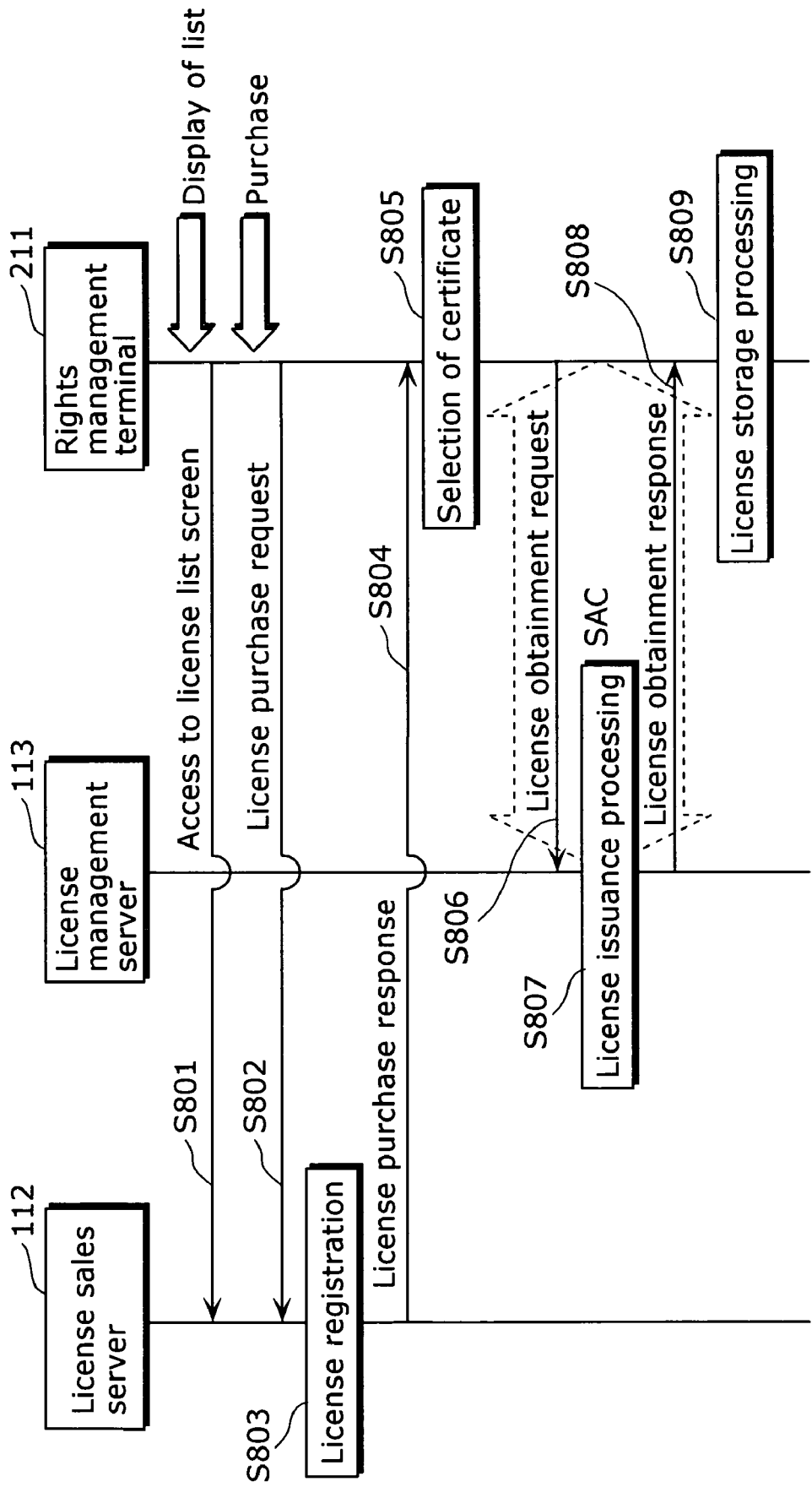
FIG. 8 is a diagram showing a sequence of license issuance performed in a usage history collection system 1.

FIG. 8 is a diagram showing a sequence of issuing a license.

As shown in FIG. 8, the user firstly requests for "Display of list" to the rights management terminal 211 for verifying a list of licenses that are on sale. When accepting "Display of list" inputted from the user via the input/output I/F 2117, the scenario control unit 2113 in the rights management terminal 211 accesses to a screen (i.e. a license list screen) displaying a list of licenses provided by the license sales server 112 via the communication processing unit 2111 (S801), and displays a license list screen 901 shown in FIG. 9 via the input/output I/F 2117. In the case where the list of licenses includes licenses for user's favorite contents such as a final episode of "Black Tower" and a baseball match of Daiei vs Giant, the user requests for "Purchase" to the input/output I/F 2117. When accepting "Purchase" inputted by the user via the input/output I/F 2117, the scenario control unit 2113 transmits, to the license sales server 112 via the communication processing unit 2111, a license purchase request that includes a license ID of the requested license and a user ID (S802).

When receiving a license purchase request, the license sales server 112 associates the license ID with the specified user ID, and performs license registration (S803). After that, the license sales server 112 sends back, to the rights management terminal 211, a license purchase response (S804) that includes access information such as URI of the license management server 113.

When receiving the license purchase response (S804) via the communication processing unit 2111 and the scenario control unit 2113, the certificate selection processing unit 2112 in the rights management terminal 211 selects a public key certificate to be used for executing a license obtainment command (S805).

The certificate selection processing (S805) is performed according to the flowchart of the subroutine shown in FIG. 10.

As shown in FIG. 10, when receiving an execution command, the certificate selection processing unit 2112 judges whether or not the command indicates transmission of usage history (S1001). In the case where the command indicates transmission of usage history (Yes in S1001), the certificate selection processing unit 2112 obtains license data from the terminal DB 2119 (S1002), extracts a usage history transmission certificate (i.e. an anonymous certificate) and a private key, from the obtained license data, and terminates the processing of selecting a certificate (S1003). In the case where the command does not indicate transmission of usage history (No in S1001), the certificate selection processing unit 2112 obtains a normal certificate and a private key from the terminal DB 2119 (S1004), and terminates the processing.

As it is judged as "No" in "Execute transmission of usage history?" in S1001, the processing proceeds to "Obtain normal certificate" in S1004, and is terminated. The license obtainment command instructs the scenario control unit 2113 to use the normal public key certificate that includes a client ID of the rights management terminal 211 for mutual authentication with the server in order to form a secure communication line SAC. That is to say, after the selection of the public key certificate, the scenario control unit 2113 refers to the access information included in the license purchase response, and specifies a license management server 113 that obtains a license. Then, after authentication processing is performed using the selected public key certificate (i.e. a normal certificate) and the private key, a license obtainment request (S806) that includes a license ID is transmitted to the license management server.

Note that the normal certificate includes, as shown in FIG. 11, information such as a version (e.g. 02), a serial number (e.g. 0C000001 which is a client ID that identifies a terminal), an issuer (e.g. an agent such as Certificate Authority), a validated period (e.g. from Jan. 1, 2004 to Dec. 31, 2006), a public key (i.e. public key data), and a signature to be signed on the normal certificate. As a result, the rights management terminal 211 communicates with the license management server 113, each knowing who is at the end of the communication, that is, without that respective privacy is protected.

Figure 12:
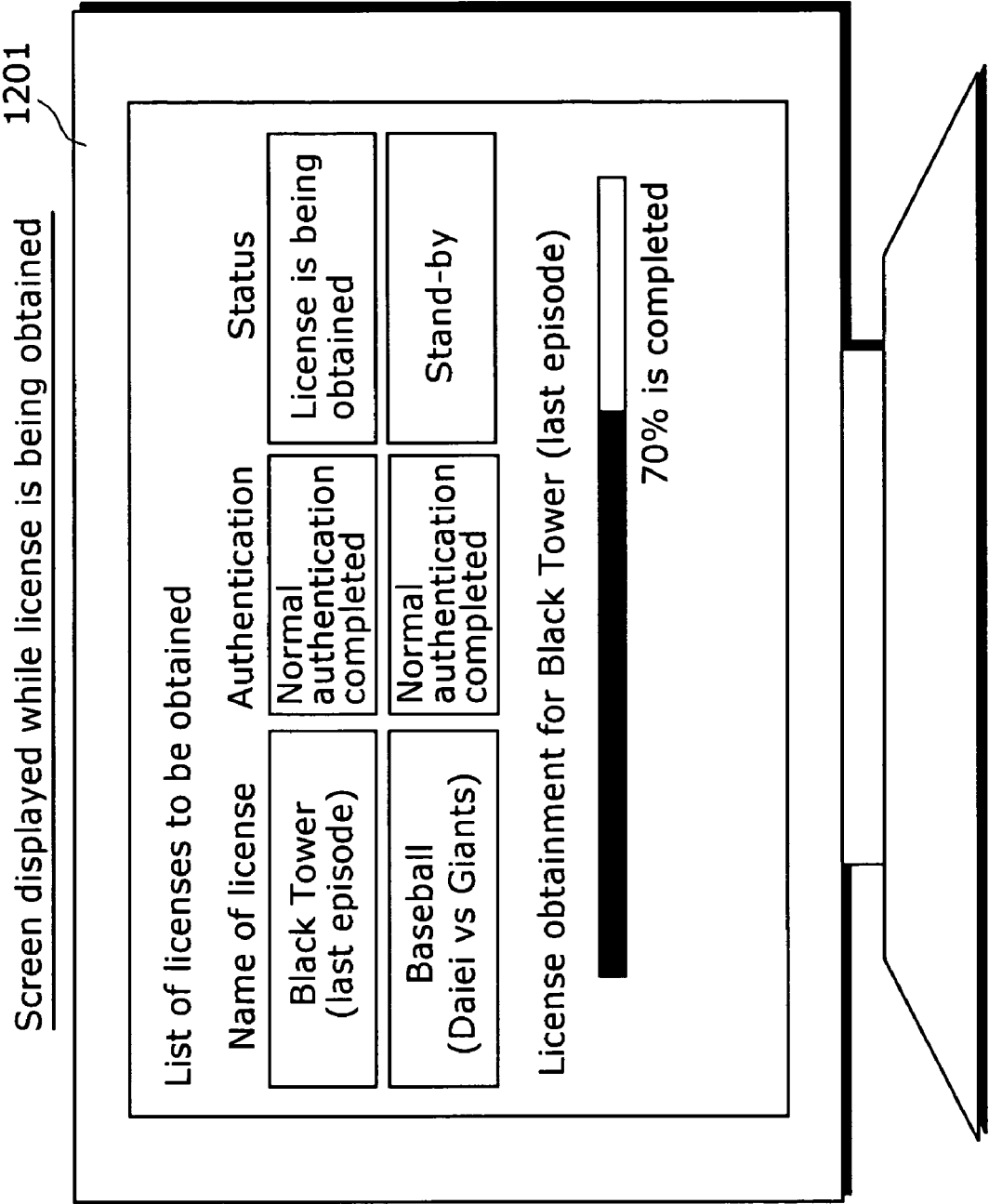
FIG. 12 is a diagram showing a screen displayed by the rights management terminal 211 while a license is being obtained.

FIG. 12 shows an example of a screen displayed while a license is being obtained.

As shown in FIG. 12, the screen is characteristic in that it presents, to the user, the authentication processing that has just been performed.

When receiving the license obtainment request (806) via the communication processing unit 1134 and the scenario control unit 1132, the license processing unit 1133 in the license management server 113 executes the processing of issuing a license (S807).

Figure 13:
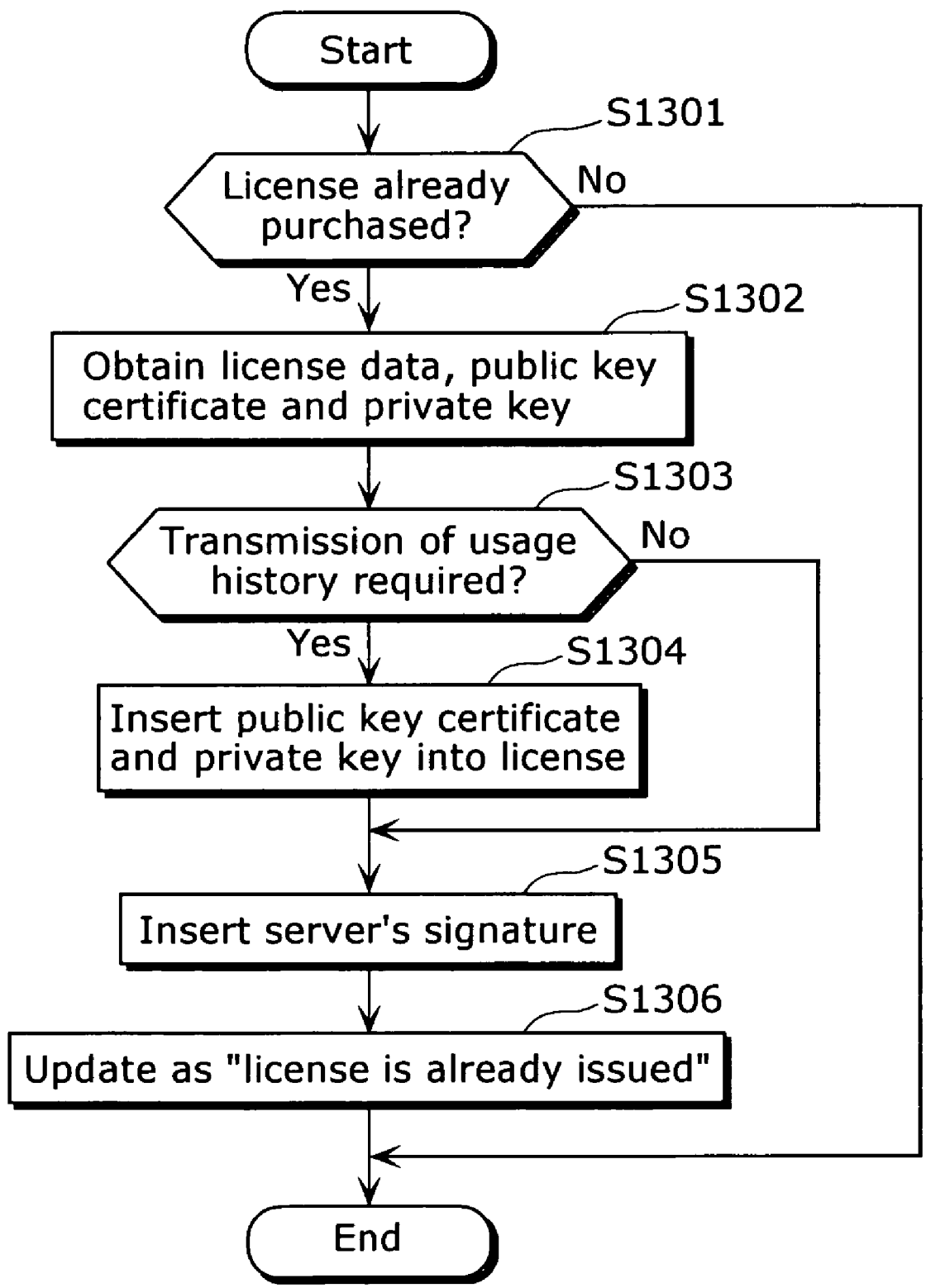
FIG. 13 is a flowchart showing a subroutine performed in a processing (S807) of issuing a license shown in FIG. 8.

The license issuance processing (S807) is performed in accordance with a subroutine shown in the flowchart in FIG. 13.

As shown in FIG. 13, the license processing unit 1133 firstly examines whether or not the license is properly purchased as specified by the user (S1301). More precisely, the client ID of the rights management terminal 211 is extracted from the public key certificate (i.e. a normal certificate) obtained at the time of authentication, and the user ID that corresponds to the client ID is identified using the member information DB 1171 in the DB group 117. Then, whether or not the license ID specified in the license obtainment request (S806) is stored in association with the user ID is judged using the purchase information DB 1173 in the DB group 117.

As a result of the judgment, in the case where the user ID and the license ID are not associated with each other (No in S1301), the license processing unit 1133 terminates the license issuance processing.

In the case where the user ID and the license ID are associated with each other (Yes in S1301), a license that corresponds to the license ID and a pair of public key certificate to be used for authentication performed at the time of transmitting a usage history and a private key are obtained from the license DB 1172 (S1302).

Figure 14:
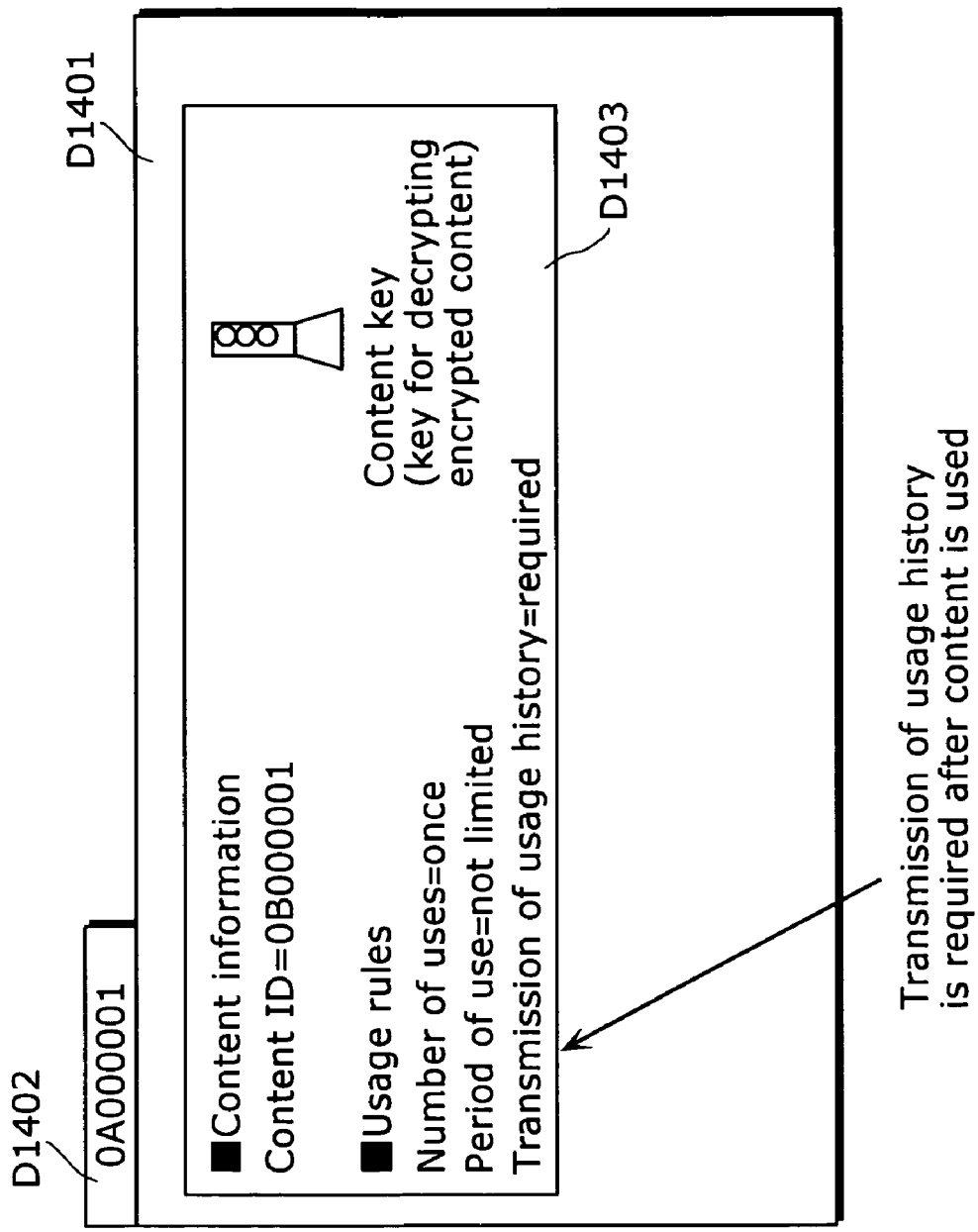
FIG. 14 shows a data structure of a license before insertion of a public key certificate (anonymous certificate) and a private key.
Figure 16:
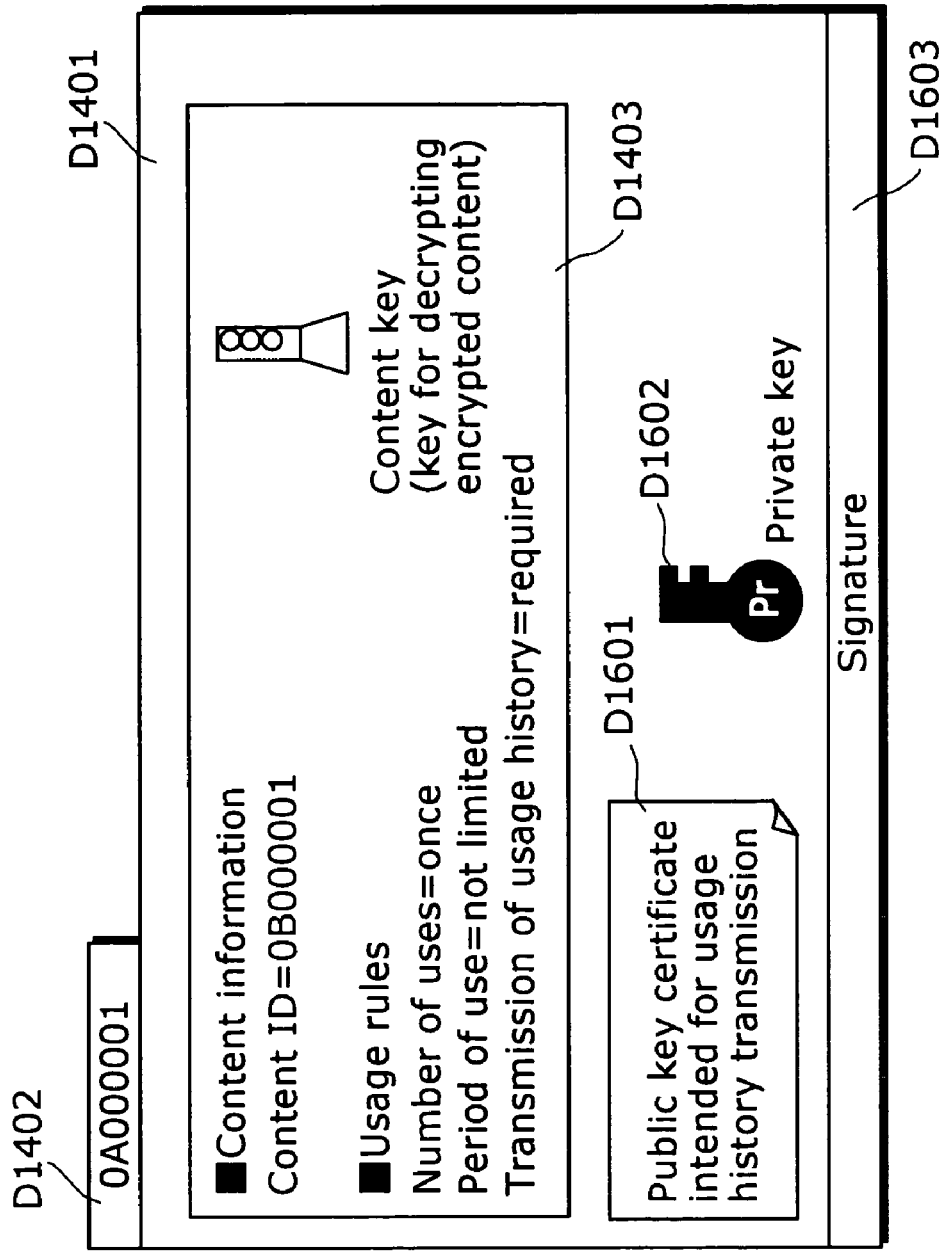
FIG. 16 shows a data structure of a license after the insertion of a public key certificate (anonymous certificate) and a private key.

FIG. 14 shows a data structure of the license obtained from the license DB 1172.

As shown in FIG. 14, the license D1401 includes: a license ID (D1402), a content key for decrypting an encrypted content for which a license is requested; content information (i.e. a content ID) for specifying the content for which a license is requested; and data (D1403) that includes usage rules. The usage rules indicate a number of times a content can be used (e.g. once), a period of use (e.g. not limited), and a transmission of usage history (e.g. required). Note that in the case where "required" is indicated for transmission of usage history, the user who has purchased the license needs to transmit a usage history after the use of the content.

FIG. 15 shows a data structure of the public key certificate (i.e. an anonymous certificate) obtained from the license DB 1172.

As shown in FIG. 15, in the public key certificate intended for transmission of usage history, a license ID ("0A000001" in FIG. 15) is described in the place where a client ID is described in the case of public key certificate for a normal terminal. Since the license ID cannot be associated with a terminal ID, it is impossible to identify the terminal. More precisely, in such public key certificate, the following are described: a version (e.g. 02), a serial number (e.g. 0A000001), an issuer (e.g. Certificate Authority), a validated period (from Jan. 1, 2004 to Dec. 31, 2006), a public key (i.e. pubic key data) and a signature of the issuer. Note that a license ID, instead of a client ID, is described in the certificate to be used for authentication at the time of transmission of usage history, however, the present invention is not limited to this. An arbitrary character string such as a content ID and a server ID may be described instead, or nothing may be described. Namely, the information to be included in the certificate should not include information that identifies a terminal or the user who uses the terminal. Thus, user's privacy can be protected.

After obtaining the license as well as a pair of the public key certificate and the private key, the license management server 113 refers to the usage rules included in the data D1403 of the license D1401, and judges whether or not a transmission of usage history is required (S1303).

As a result of the judgment, in the case where the transmission is required, that is, in the case where "required" is indicated for transmission of usage history (Yes in S1303), the license processing unit 1133 inserts, into the license D1401, the public key certificate D1601 and the private key D1602 which are obtained in S1302 (S1304), as well as the signature D1603 of the license management server 113 (S1305). In the case where transmission is not required as a result, that is, in the case where "not required" is indicated for transmission of usage history (No in S1303), the license processing unit 1133 inserts, into the license D1401, only the signature D1603 of the license management server 113 (S1305). After that, the license that corresponds to the license indicated in the purchase information DB 1173 in the DB group 117 is updated to be "already issued" (S1306), and the license issuance processing is terminated. Note that, here, it is explained under the assumptions that "required" is indicated for transmission of usage history in the usage rules included in the license, and that a pair of the public key certificate D1601 and the private key D1602 are inserted into the license.

After the insertion of the public key certificate (i.e. anonymous certificate) and the signature during the license issuance processing (S807), the scenario control unit 1132 sends back a license obtainment response that includes the license, to the rights management terminal 211 (S808).

After receiving a license obtainment response via the communication processing unit 2111 and the scenario control unit 2113, the license processing unit 2114 in the rights management terminal 211 extracts the license out of the license obtainment response, and stores the extracted license into the terminal DB 2119 (S809).

Note that in the license issuance sequence as described above, charging is not performed for the purchase of license, but a certain fees may be charged for the license. When a license is purchased, a SAC may be formed, using a normal certificate, between the rights management terminal 211 and the license sales server 112.

(Sequence of Transmitting a Usage History)

The following describes a sequence of transmitting, to the usage history collection server 114, a usage history generated after a content is used.

Figure 17:
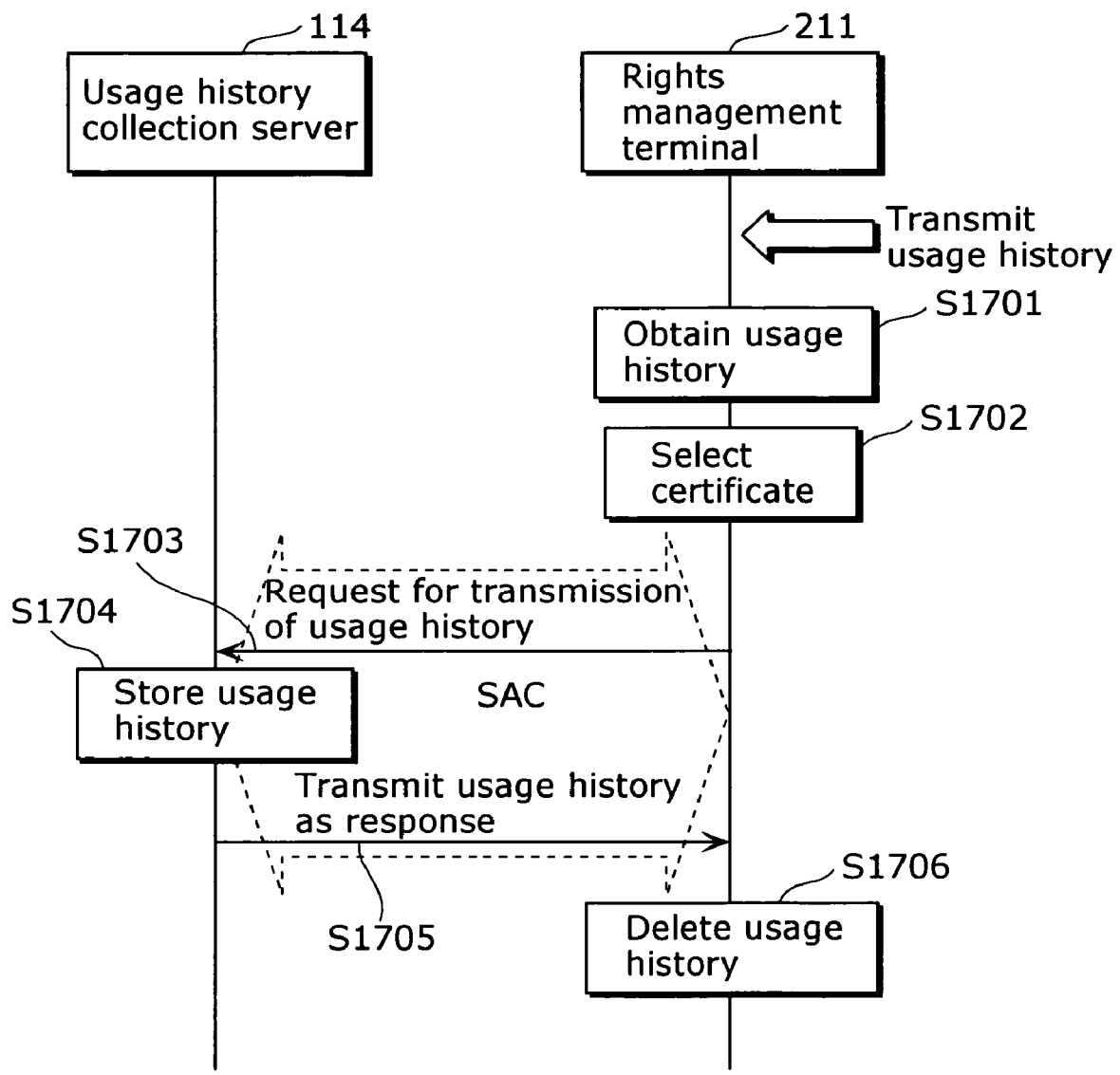
FIG. 17 is a diagram showing a sequence of usage history transmission performed between the rights management terminal 211 and the usage history collection server 114.

FIG. 17 is a diagram showing a sequence of transmitting a usage history between the rights management terminal 211 and the usage history collection server 114.

As shown in FIG. 17, when receiving a request for "usage history transmission" from the user via the input/output I/F 2117 and the scenario control unit 2113, the usage history processing unit 2116 in the rights management terminal 211 obtains a requested usage history from the terminal DB 2119 (S1701). The certificate selection processing unit 2112 then selects the public key certificate to be used for transmission of usage history (S1702). Note here that it is described that the request for "usage history transmission" is triggered by the reception of a user's instruction, however, the request may be automatically sent after the content is used.

The selection of the certificate (S1702) is performed according to the flowchart shown in FIG. 10. Here, it is judged to be "Yes" in response to "Execute usage history transmission?" in S1001 so that the license that corresponds to the usage history to be transmitted is obtained from the terminal DB 2119 (S1002), and a public key certificate (i.e. an anonymous certificate) intended for transmission of usage history and a private key are extracted from the license (S1003).

The scenario control unit 2113 in the rights management terminal 211 performs authentication with the usage history collection server 114 using the obtained public key certificate and private key, and transmits the usage history transmission request that includes a usage history, after the SAC is formed.

Figure 18:
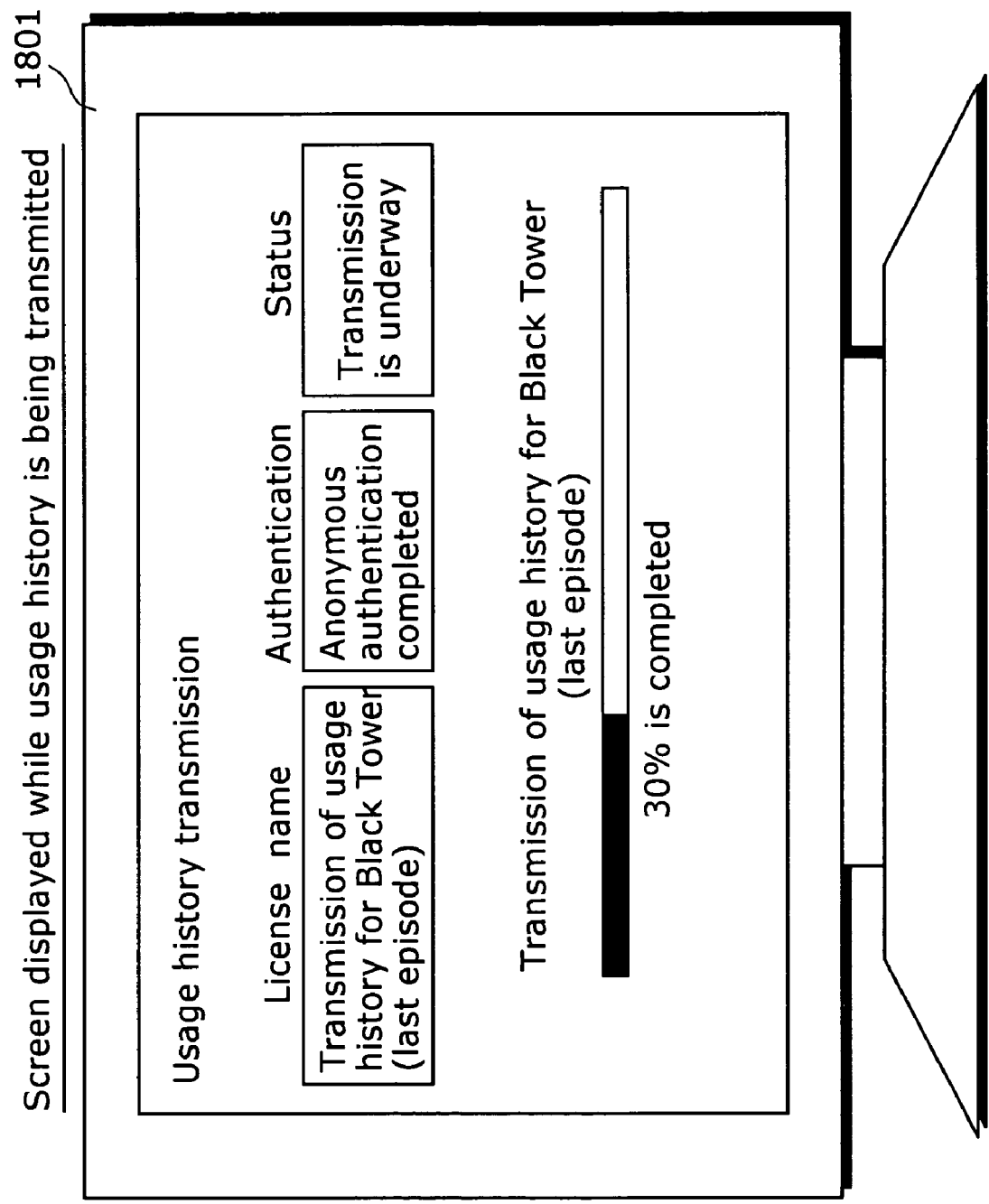
FIG. 18 is a diagram showing a screen displayed by the rights management terminal 211 while a usage history is being transmitted.

Here, FIG. 18 shows an example of a screen displayed while a usage history is being transmitted. As shown in FIG. 18, the screen is characteristic in that the authentication that has been executed is presented to the user.

When receiving the usage history transmission request via the communication processing unit 1144 and the scenario control unit 1142, the usage history judgment processing unit 1143 in the usage history collection server 114 extracts the usage history included in the request, and stores it into the usage history DB 1174 in the DB group 117 via the DB I/F 1141 (S1704). After the storage of the usage history, the usage history judgment processing unit 1143 sends back, to the rights management terminal 211, a usage history transmission response that includes the result of the processing is transmitted via the scenario control unit 1142 and the communication processing 1144 (S1705).

When receiving the usage history transmission response, the usage history processing unit 2116 in the rights management terminal 211 deletes the transmitted usage history from the terminal DB 2119 (S1706).

Thus, in the sequence of usage history transmission, an anonymous certificate and a private key paired with the certificate are selected, and authentication is performed using the anonymous certificate. Anonymousness is therefore assured, and also, it is verified that the usage history is transmitted from an authorized rights management terminal by obtaining only a license ID that is an assumed name. In this way, usage information can be collected after it is verified that the usage information is transmitted from an authorized terminal apparatus, without identifying the terminal apparatus.

Figure 19:
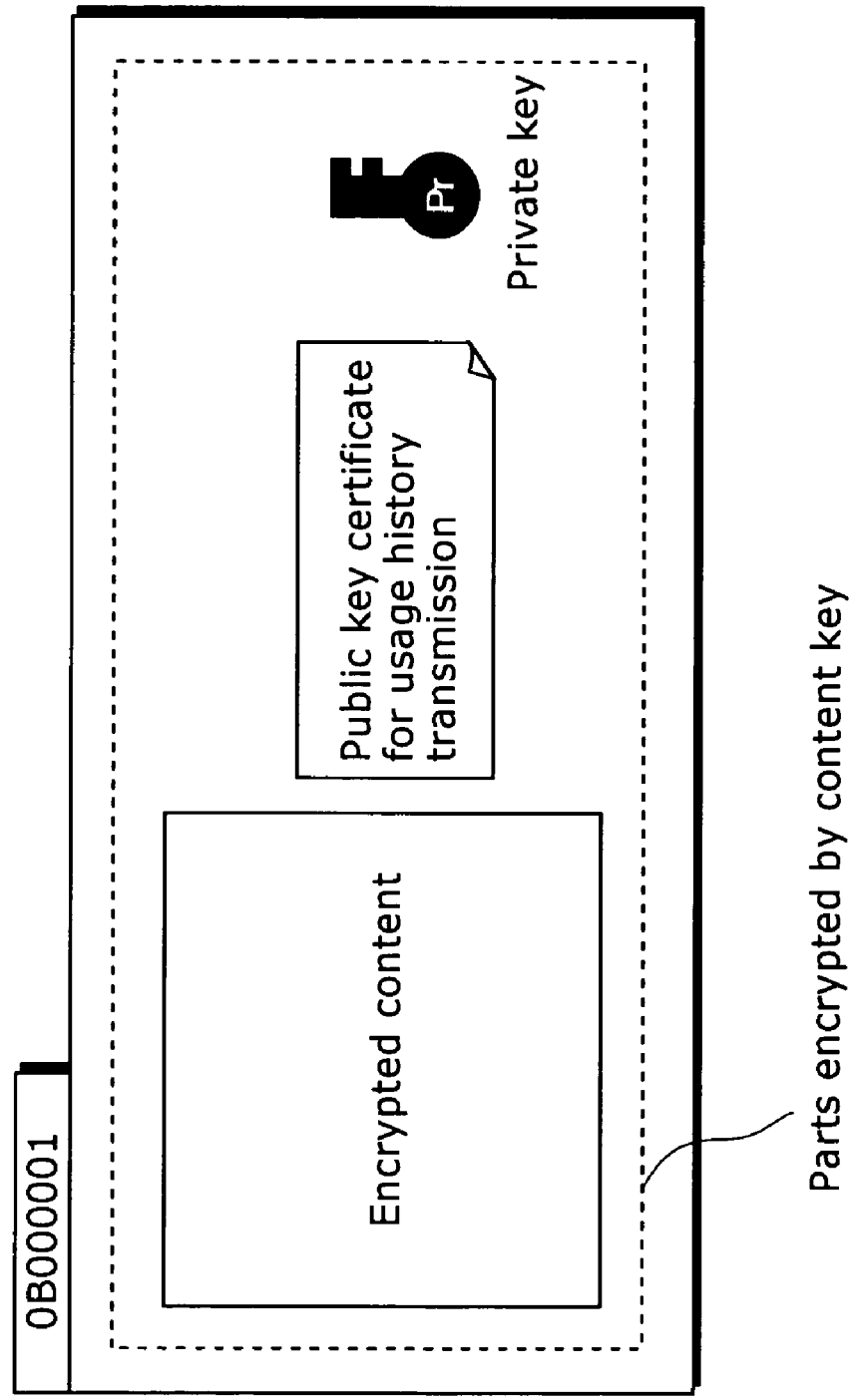
FIG. 19 shows a data structure of an encrypted content according to another embodiment of the present invention.

Note that in the first embodiment, it is described that the license is distributed after the public key certificate (i.e. an anonymous certificate) to be used for transmission of usage history and the private key are inserted into the license. The present invention, however, is not limited to this, and an anonymous certificate and a private key may be included in an encrypted content, as shown in FIG. 19, or may be included in the metadata that indicates an outline of a content or a license. The terminal DB 2119 in the rights management terminal 211 may previously hold public key certificates and private keys of tow types: one for normal use; and the other for transmission of usage history. An anonymous certificate and a private key may be distributed from a server when the user subscribes a service provided under the usage history collection system 1, or may be regularly transmitted using broadcast waves or the like. In such cases, as is the case of the license management server 113, the content distribution server 115 or the member management server 111 may be equipped with a function to include, into an encrypted content, an anonymous certificate and a private key paired with the certificate.

Figure 20:
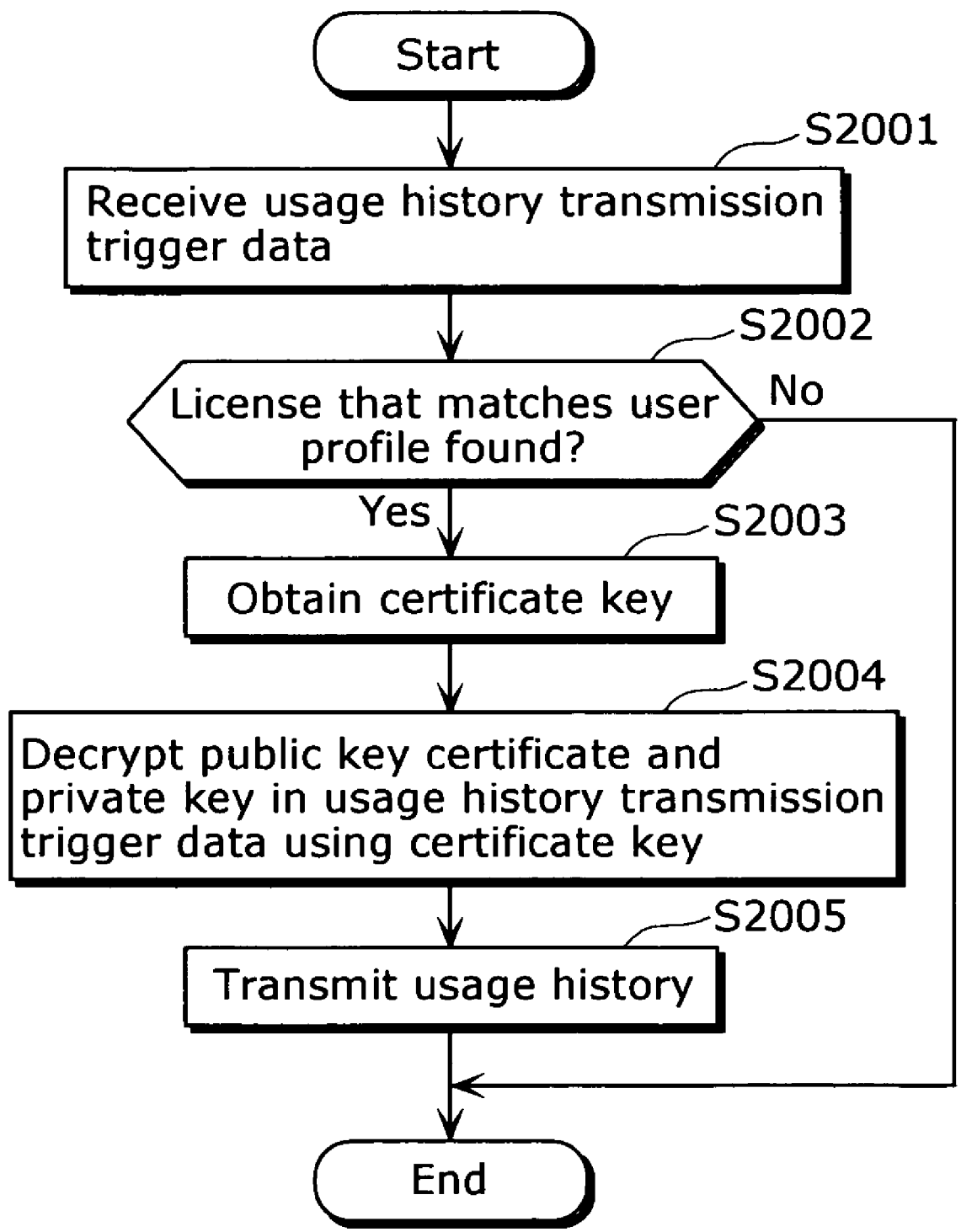
FIG. 20 is a flowchart for performing a transmission of usage history based on usage history transmission trigger data, according to another embodiment of the present invention.

The first embodiment of the present invention also describes that the rights management terminal 211 starts the transmission of a usage history triggered by a reception of a user's instruction or an indication of an end of the content usage. The present invention, however, is not restricted to this. The usage history collection server 114 may transmit usage history transmission trigger data using broadcast waves or the like so that the rights management terminal 211 may transmit a usage history, according to the flowchart shown in FIG. 20, when receiving such trigger data.

To be more precise, when receiving the usage history transmission trigger data via the communication processing unit 2111 and the scenario control unit 2113 (S2001), the usage history processing unit 2116 in the rights management terminal 211 judges whether or not the license requested by the user corresponds to one of the licenses stored in the terminal DB 2119 (S2002).

Figure 21:
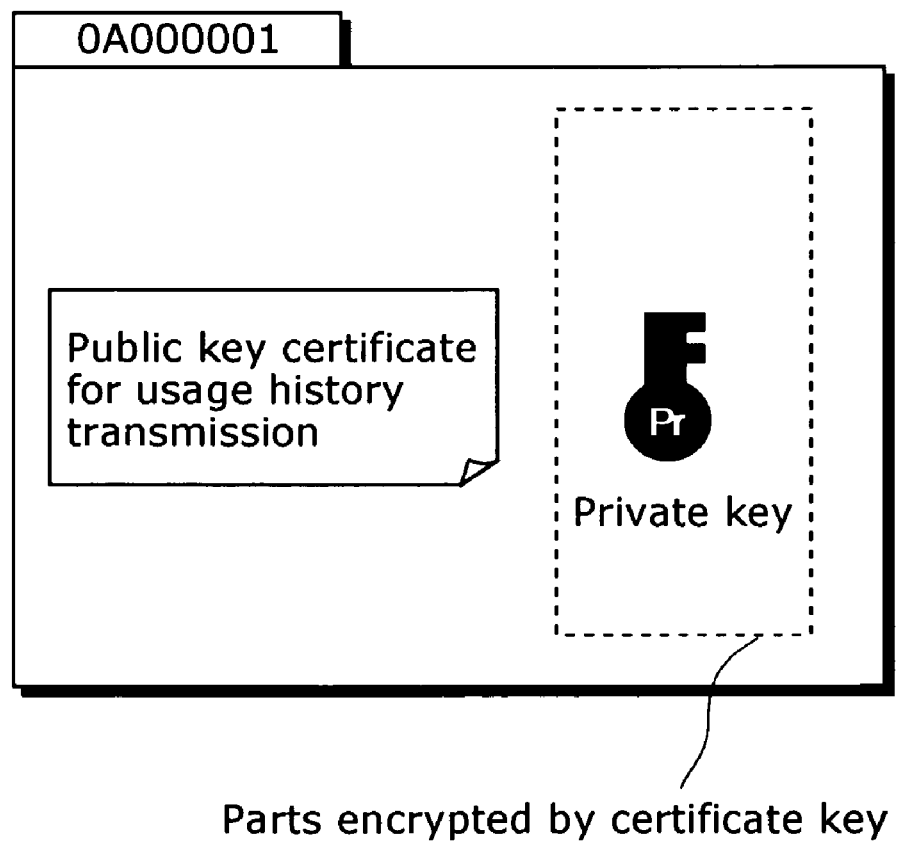
FIG. 21 shows a data structure of usage history transmission trigger data, according to another embodiment of the present invention.

Here, the usage history transmission trigger data as described above has a data structure as shown in FIG. 21, and includes a public key certificate intended for usage history transmission, and a private key which are associated with a license ID. The private key is encrypted by a certificate key.

Figure 22:
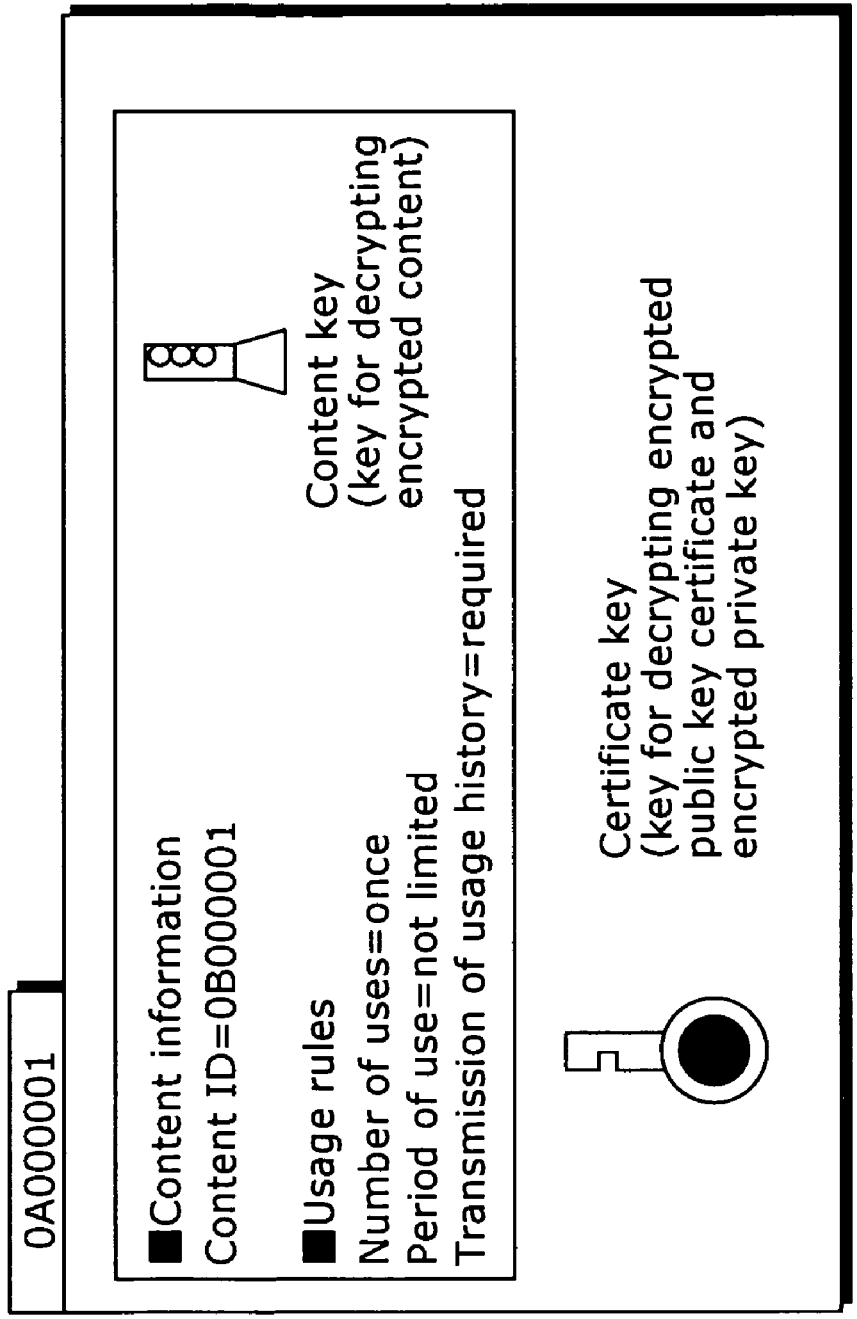
FIG. 22 shows a data structure of a license that includes a certificate key, according to another embodiment of the present invention.
Figure 23:
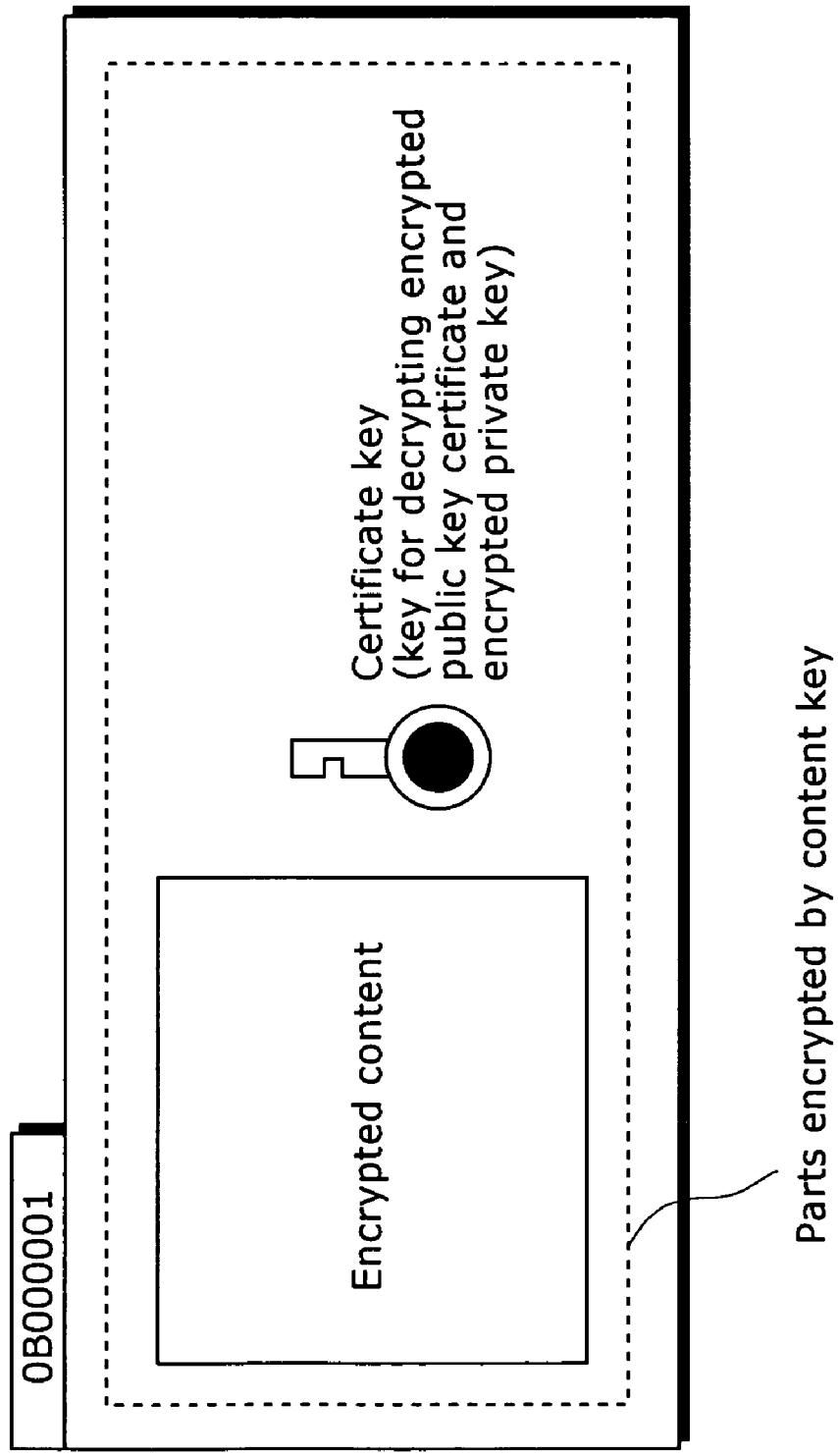
FIG. 23 shows a data structure of an encrypted content that includes a certificate key, according to another embodiment of the present invention.

The license and the encrypted content, which are obtained by the rights management terminal 211 from the license management server 113 and the content distribution server 115, have the data structure as shown in FIGS. 22 and 23 respectively, and hold a certificate key. That is to say that the data structure of a license is a structure in which a certificate key for decrypting the encrypted public key certificate (i.e. an anonymous certificate) and private key is included in the license, as shown in FIG. 22. As shown in FIG. 23, the data structure of a content is a structure in which a certificate key is included in the content, and the content and the certificate key are encrypted using a content key.

In the case where the requested license is found (Yes in S2002), the certificate selection processing unit 2112 obtains a certificate key from the license (S2003), and decrypts the public key certificate (i.e. an anonymous certificate) and the private key included in the usage history transmission trigger data, using the obtained certificate key (S2004).

After the decryption of the public key certificate and the private key, the scenario control unit 2113 in the rights management terminal 211 performs authentication with the usage history collection server 114 using the obtained public key certificate and private key, and transmits a usage history after the formation of SAC (S2005).

Also in this case, an anonymous certificate and a private key paired with the certificate are selected, and authentication is performed using the anonymous certificate. Thus, by obtaining only a license ID that is an assumed name, anonymousness is assured, and it is verified that the usage history is transmitted from an authorized rights management terminal. In this way, usage information can be collected after it is verified that the usage information is transmitted from an authorized terminal apparatus.

Figure 24:
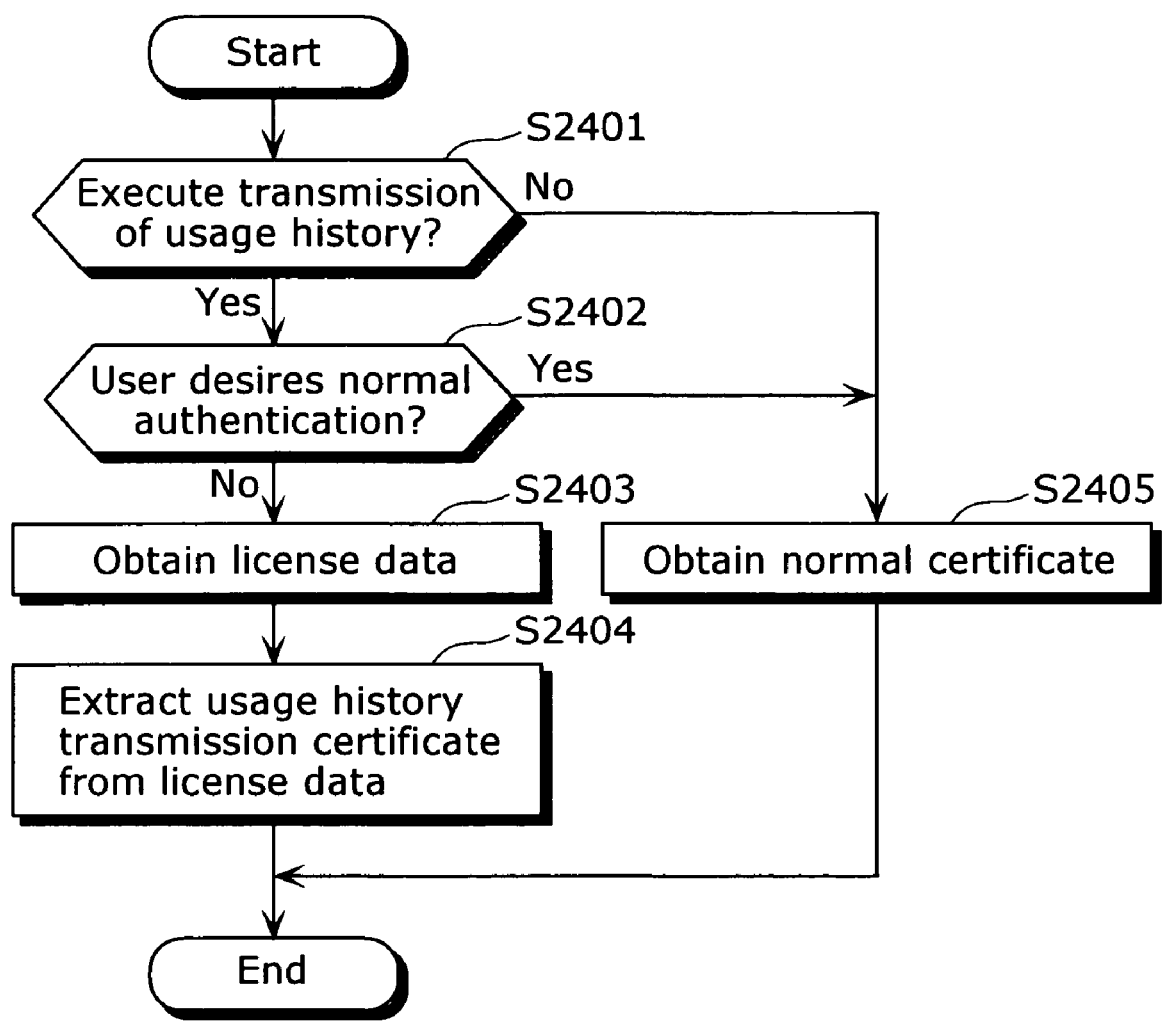
FIG. 24 is a flowchart for providing a user with options for selecting a certificate, according to another embodiment of the present invention.

The first embodiment of the present invention describes with reference to FIG. 10 that authentication is performed, unlike an usual case, by using a public key certificate for anonymous use and a private key, only in the case where a command for transmitting a usage history is executed. The present invention, however, is not limited to this. As shown in FIG. 24, in the case where a usage history transmission command is executed (Yes in S2401), it is judged whether or not the user desires to perform authentication using a normal public key certificate and a private key (S2402), so that the user may obtain an anonymous certificate as desired (S2403, S2404), or a normal certificate (S2405), or the user may select either of them.

Thus, the authentication can be performed according to a degree of user's consciousness on his/her privacy.

Figure 25:
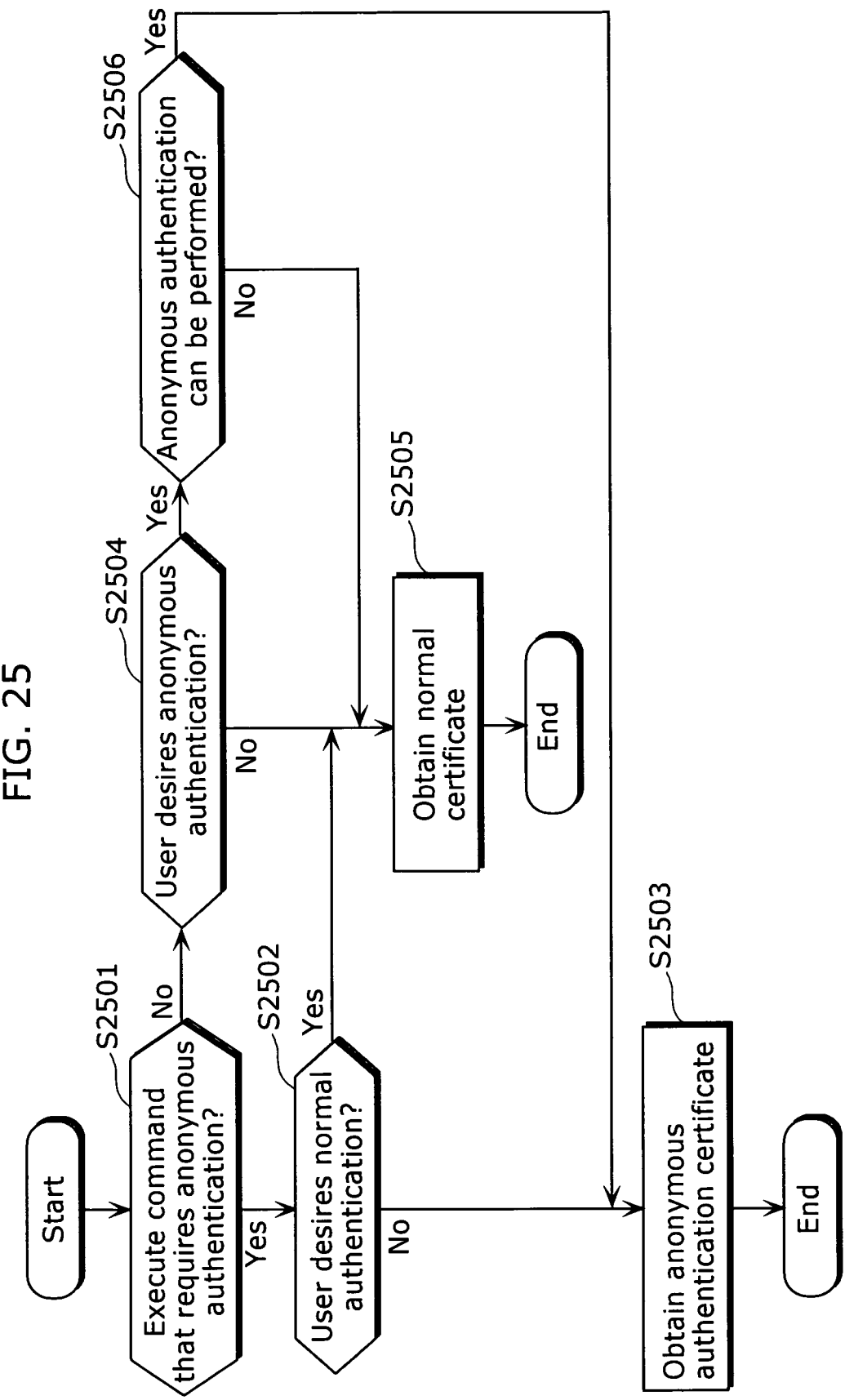
FIG. 25 is a flowchart for selecting a certificate in response to a command for anonymous authentication, according to another embodiment of the present invention.

The first embodiment of the present invention also describes with reference to FIG. 10 that authentication is performed using a public key certificate for anonymous authentication, which is different from a normal case, and a private key, only in the case where a command for transmitting a usage history is executed. The present invention, however, is not limited to this. As shown in FIG. 25, even in the case where a command, which might cause a problem in terms of privacy when the terminal is identified, is executed, namely, in the case where a command of requesting an anonymous certificate is not executed (No in S2501), in other words, in the case where the user selects a normal certificate, whether or not the user desires authentication using an anonymous certificate and a private key is judged (S2504). In the case where anonymous authentication is allowed to be performed (Yes in S2506), authentication may be performed by switching to a public key certificate intended for anonymous authentication which is an unusual case, and a private key (S2503). In this case, authentication may be performed based on user's preferences.

Thus, it is possible to perform authentication that reflects even more user's consciousness on his/her privacy.

Second Embodiment

In the first embodiment, a SAC is established using the same anonymous certificate pair (one type of anonymous certificate pair) regardless of age and sex, however, different anonymous certificate pairs may be used according to attribute information such as age and sex.

Figure 26:
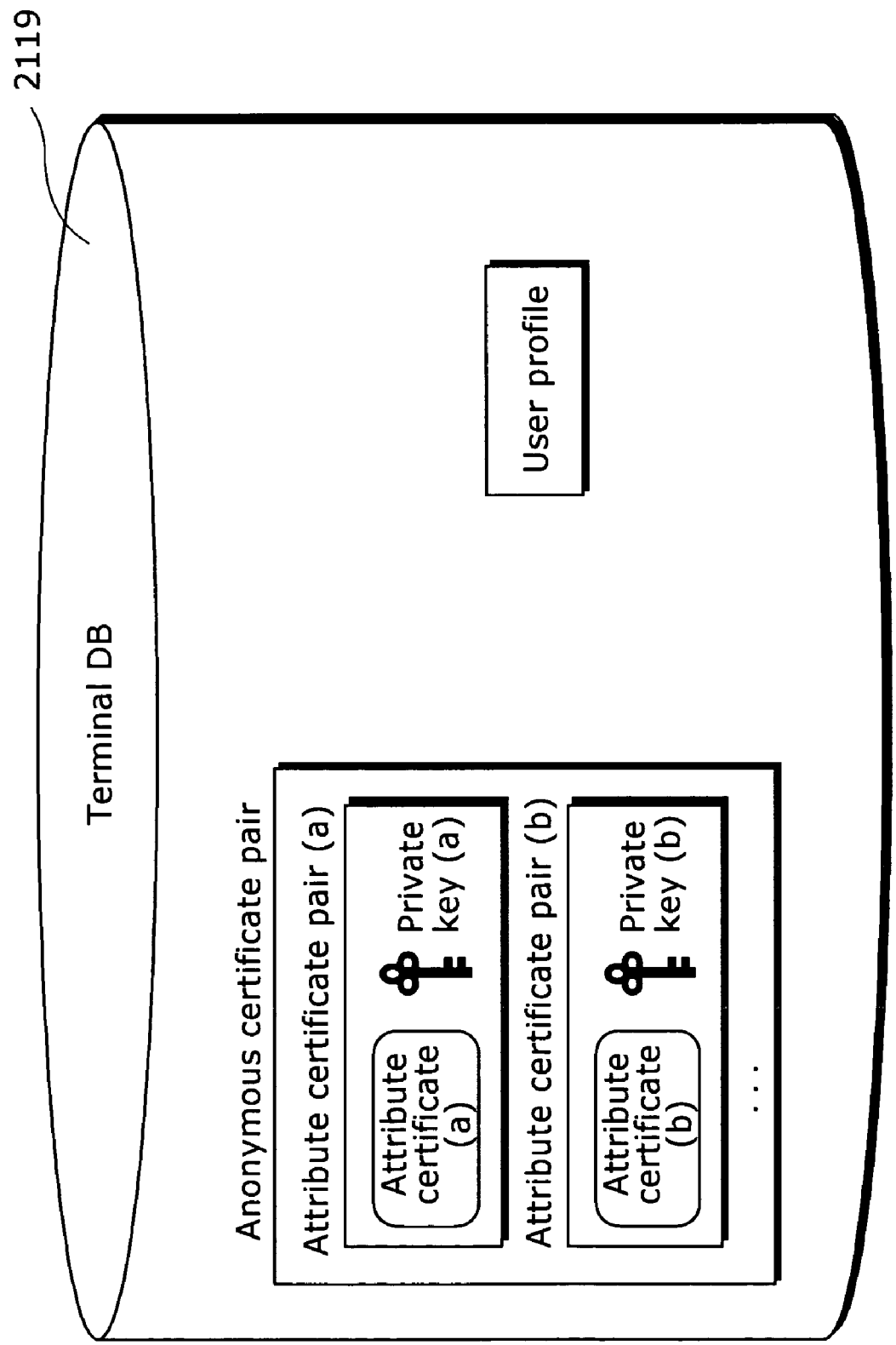
FIG. 26 shows a plurality of attribute certificate pairs and a user profile which are managed by a terminal DB 2119 according to a second embodiment of the present invention.

To be more precise, as shown in FIG. 26, an anonymous certificate pair common to each of the terminals that consists of plural attribute certificate pairs, each being made up of an anonymous certificate (i.e. an attribute certificate) that includes attribute information, and a private key. In each attribute certificate, attribute information such as age and sex is described. The attribute information does not identify a user but, for example, shows a profile of a user. The terminal DB 2119 holds a profile of the user (i.e. a user profile) who uses the terminal DB 2119.

More in detail, as shown in FIG. 27A, the attribute certificate (a) holds information such as "teenage" for age and "female" for sex while the attribute certificate (b) holds information such as "twenties" for age and "female" for sex as shown in FIG. 27B. As shown in FIG. 27C, a user profile holds information such as "twenties" for age and "female" for sex.

In the case where the terminal has such structure and the certificate selection processing unit 2112 in the terminal selects an anonymous certificate pair for communication with a server, the certificate selection processing unit 2112 compares the selected anonymous certificate pair and a profile of the user who uses the terminal, identifies, among the anonymous certificate pairs, the attribute certificate pair that corresponds to the information in the user profile (an attribute certificate pair (b) according to the example shown in FIGS. 27A to 27C), and establishes a SAC using the attribute certificate pair.

Thus, by adding such attribute information, the server can even specify a profile of a user with whom a SAC is established while protecting the user's privacy. This realizes a collection of usage histories targeting specific age and sex as well as questionnaires with regard to user's content use.

It should be noted that, as in the case of distributing an anonymous certificate that does not include the attribute information described in the first embodiment, any of the patterns indicated below may be used as a method of distributing an anonymous certificate that includes such attribute information, and a private key.

1) Distributing a license after including an anonymous certificate and a private key into the license 2) Distributing an encrypted content after including an anonymous certificate and a private key into the encrypted content 3) Distributing metadata after including an anonymous certificate and a private key into the metadata 4) Allowing the terminal DB 2119 in the rights management terminal 211 to previously hold an anonymous certificate and a private key paired with the certificate 5) Distributing an anonymous certificate and a private key paired with the certificate from the server, when the user subscribes to a service provided under the usage history collection system 1

6) Regularly transmitting an anonymous certificate and a private key paired with the certificate, using broadcast waves or the like Third Embodiment The second embodiment describes the method in which an anonymous certificate pair that includes plural attribute certificate pairs is passed to a terminal, and the terminal selects an attribute certificate pair for establishing a SAC. This method causes a problem that a lot of tasks are imposed on the terminal because data cost for anonymous certificates increases in proportion to the number of attribute patterns. A new method proposed here is not to pass, at the time of distribution, the attribute certificate that includes various attribute patterns, but to pass only one attribute certificate pair that matches the information indicated in a user profile.

Figure 28:
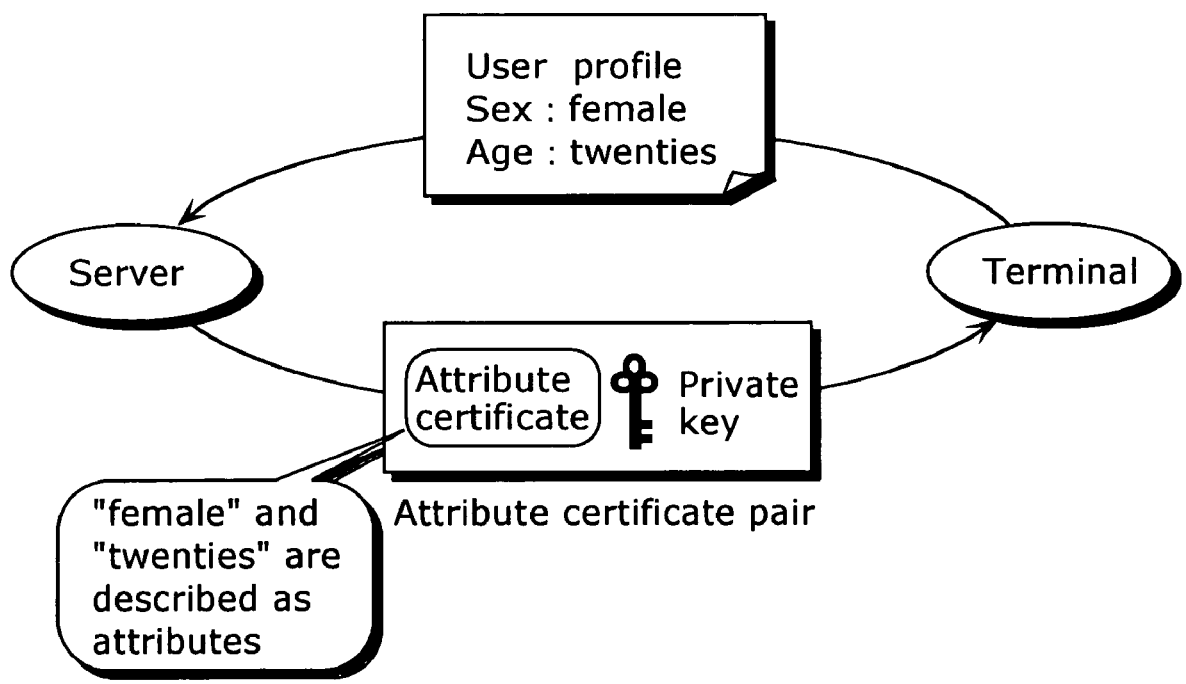
FIG. 28 shows an exchange of a user profile and an attribute certificate pair performed between a terminal and a server according to a third embodiment of the present invention.

As shown in FIG. 28, for example, the user may input his/her profile on the Web at the time of signing a contract for services, and an attribute certificate pair which is made up of an attribute certificate that includes the attribute information matching the information indicated in a user profile, and a private key, may be transmitted as a response.

Thus, it is possible to reduce the tasks imposed on the terminal since the terminal does not need to hold unnecessary attribute certificates, but holds only the attribute certificate that matches the information indicated in a user profile.

Fourth Embodiment

In the first embodiment, an anonymous certificate is used for transmitting a usage history of the content used by the user. However, usage information regarding content use may be generally used, instead, for collecting anonymous questionnaires.

For example, in the case of applying the method described in the third embodiment for collecting anonymous questionnaires, the user inputs his/her profile on the Web, and an attribute certificate pair which is made up of an attribute certificate that includes attribute information matching the information indicated in a user profile and a questionnaire is transferred to the terminal as a response, as shown in FIG. 29.

A SAC is established between the terminal and the server using the attribute certificate pair so that the questionnaire is collected.

After the collection of the questionnaire, the server transmits, to the terminal, gift information in return for the response to the questionnaire, and the user can apply for a gift based on the gift information.

Therefore, even in the case described above, the server can even identify a user profile of the person with whom a SAC is established while protecting the user's privacy, so that the questionnaire can be collected targeting specific age and sex.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A usage information collection system according to the present invention is applicable to various kinds of computer apparatuses such as a personal computer and a Personal Digital Assistant that makes up a system for collecting usage information in the distribution of content as service.

What is claimed is:

1. A rights management terminal that manages a copyright of a content using a license that includes a usage rule of the content, said rights management terminal comprising:
  a first certificate management unit operable to manage, as a set, a first public key certificate and a first private key, the first public key certificate including identification information that identifies at least one of said rights management terminal and a user using said rights management terminal, and the first private key being paired with a first public key included in the first public key certificate;
  a second certificate management unit operable to manage, as a set, a second public key certificate and a second private key, the second public key certificate not including the identification information, the second private key being paired with a second public key included in the second public key certificate;
  a selection processing unit operable to select, as a set, one of the following: the first public key certificate and the first private key; and the second public key certificate and the second private key; and
  an authentication processing unit operable to execute authentication for communicating with a server apparatus, using the public key certificate and the private key which are selected as a set by said selection processing unit,
  wherein said selection processing unit is operable to select, as a set, the public key certificate and the private key to be used for authentication, according to a type of execution command used during the communication with the server apparatus,
  wherein said selection processing unit is operable (i) to select, as a set, the second public key certificate and the second private key in the case where the execution command indicates a transmission, to the server apparatus, of usage information related to a usage of the content used by the user, and (ii) to select, as a set, the first public key certificate and the first private key in other cases, and
  wherein the usage information is a usage history of the content.

2. The rights management terminal according to claim 1, wherein said selection processing unit is operable to select, as a set, the second public key certificate and the second private key in the case where the user using said rights management terminal inputs, into said rights management terminal, the execution command for transmitting the usage history to the server apparatus.

3. The rights management terminal according to claim 1, wherein said selection processing unit is operable to select, as a set, the second public key certificate and the second private key in the case where the server apparatus sends, to said rights management terminal, the execution command for transmitting the usage history to the server apparatus.

4. The rights management terminal according to claim 1, further comprising
  a usage history management unit operable to manage the usage history,
  wherein said usage history management unit is operable to delete the usage history to be managed, in the case where the usage history is transmitted to the server apparatus.

5. The rights management terminal according to claim 1, wherein said second certificate management unit is operable to previously hold, as a set, the second public key certificate and the second private key before the management.

6. The rights management terminal according to claim 1, wherein said second certificate management unit is operable to manage, as a set, the second public key certificate transmitted from the server apparatus, and the second private key, in the case where the user using said rights management terminal subscribes to a service provided under a rights management system.

7. The rights management terminal according to claim 1, wherein the second public key certificate and the second private key are included in the license,
  said second certificate management unit is operable manage, as a set, the second public key certificate and the second private key, together with the license, and
  in the case where the second public key certificate and the second private key are required as a set, said selection processing unit is operable to obtain the second public key certificate and the second private key from the license.

8. The rights management terminal according to claim 1, wherein the second public key certificate and the second private key are included in the content,
  said second certificate management unit is operable to manage, as a set, the second public key certificate and the second private key, together with the content, and
  in the case where the second public key certificate and the second private key are required as a set, said selection processing unit is operable to obtain, as a set, the second public key certificate and the second private key.

9. The rights management terminal according to claim 1, wherein the second public key certificate and the second private key are included in broadcast waves,
  said rights management terminal further comprises a certificate-in-broadcast-waves obtainment unit operable to obtain the second public key certificate and the second private key from the broadcast waves, and
  said second certificate management unit is operable to manage, as a set, the second public key certificate and the second private key which are obtained by said certificate-in-broadcast-waves obtainment unit.

10. The rights management terminal according to claim 1, wherein a pair of the second public key certificate and the second private key is a pair of an attribute certificate and a third private key, the attribute certificate certifying an attribute of the user using said rights management terminal, and the third private key being paired with a third public key included in the attribute certificate, and
  in the case where the second public key certificate and the second private key are required as a set, said selection processing unit is operable to obtain a pair of the attribute certificate and the third private key.

11. The rights management terminal according to claim 10, wherein said second certificate management unit is operable to manage a pair of the attribute certificate and the third private key as the second public key certificate and the second private key respectively, the attribute certificate holding a predetermined attribute transmitted from the server apparatus, and said selection processing unit is operable to obtain a pair of the attribute certificate and the third private key, the attribute certificate holding the predetermined attribute and being managed by said second certificate management unit.

12. A rights management terminal that manages a copyright of a content using a license that includes a usage rule of the content, said rights management terminal comprising:

a first certificate management unit operable to manage, as a set, a first public key certificate and a first private key, the first public key certificate including identification information that identifies at least one of said rights management terminal and a user using said rights management terminal, and the first private key being paired with a first public key included in the first public key certificate;

a second certificate management unit operable to manage, as a set, a second public key certificate and a second private key, the second public key certificate not including the identification information, the second private key being paired with a second public key included in the second public key certificate;

a selection processing unit operable to select, as a set, one of the following: the first public key certificate and the first private key; and the second public key certificate and the second private key; and an authentication processing unit operable to execute authentication for communicating with a server apparatus, using the public key certificate and the private key which are selected as a set by said selection processing unit, wherein said selection processing unit is operable to select, as a set, the public key certificate and the private key to be used for authentication, according to a type of execution command used during the communication with the server apparatus, wherein said selection processing unit is operable (i) to select, as a set, the second public key certificate and the second private key in the case where the execution command indicates a transmission, to the server apparatus, of usage information related to a usage of the content used by the user, and (ii) to select, as a set, the first public key certificate and the first private key in other cases, and wherein the usage information is a questionnaire related to the usage of the content.

13. A rights management terminal that manages a copyright of a content using a license that includes a usage rule of the content, said rights management terminal comprising:

a first certificate management unit operable to manage, as a set, a first public key certificate and a first private key, the first public key certificate including identification information that identifies at least one of said rights management terminal and a user using said rights management terminal, and the first private key being paired with a first public key included in the first public key certificate;

a second certificate management unit operable to manage, as a set, a second public key certificate and a second private key, the second public key certificate not including the identification information, the second private key being paired with a second public key included in the second public key certificate;

a selection processing unit operable to select, as a set, one of the following: the first public key certificate and the first private key; and the second public key certificate and the second private key; and an authentication processing unit operable to execute authentication for communicating with a server apparatus, using the public key certificate and the private key which are selected as a set by said selection processing unit, wherein the second public key certificate and the second private key are included in metadata that indicates an outline of the content or the license, said second certificate management unit is operable to manage, as a set, the second public key certificate and the second private key, together with the metadata, and in the case where the second public key certificate and the second private key are required as a set, said selection processing unit is operable to obtain the second public key certificate and the second private key from the metadata.

14. A rights management terminal that manages a copyright of a content using license that includes a usage rule of the content, said rights management terminal comprising:

a first certificate management unit operable to manage, as a set, a first public key certificate and a first private key, the first public key certificate including identification information that identifies at least one of said rights management terminal and a user using said rights management terminal, and the first private key being paired with a first public key included in the first public key certificate;

a second certificate management unit operable to manage, as a set, a second public key certificate and a second private key, the second public key certificate not including the identification information, the second private key being paired with a second public key included in the second public key certificate;

a selection processing unit operable to select, as a set, one of the following: the first public key certificate and the first private key; and the second public key certificate and the second private key; and an authentication processing unit operable to execute authentication for communicating with a server apparatus, using the public key certificate and the private key which are selected as a set by said selection processing unit, wherein the pair of the second public key certificate and the second private key is a pair of an attribute certificate and a third private key, the attribute certificate certifying an attribute of the user using said rights management terminal, and the third private key being paired with a third public key included in the attribute certificate, and in the case where the second public key certificate and the second private key are required as a set, said selection processing unit is operable to obtain a pair of the attribute certificate and the third private key, wherein the pair of the second public key certificate and the second private key is made up of a plurality of pairs, each of the plurality of pairs being made up of the attribute certificate and the third private key, the attribute certificate holding an attribute different from an attribute held by another attribute certificate, and the third private key being paired with the attribute certificate, wherein said rights management terminal further comprises
a user profile management unit operable to manage a profile of the user using said rights management terminal, and
in the case where the second public key certificate and the second private key are required as a set, said selection processing unit is operable to obtain, from the plurality of pairs, a pair of the attribute certificate and the third private key, the attribute certificate holding an attribute that corresponds to an attribute indicated in the profile.

15. A server apparatus that handles a license required by a rights management terminal that uses a content, said server apparatus comprising:
   a certificate pair transmission unit operable to transmit, to the rights management terminal, a set of a second public key certificate and a second private key paired with a second public key included in the second public key certificate; and
   an authentication unit operable to authenticate the rights management terminal, using a public key certificate received from the rights management terminal for starting a data communication with the rights management terminal,
   wherein in the case where the second public key certificate is received from the rights management terminal, said authentication unit is operable to authenticate the rights management terminal by using the second public key certificate as an anonymous certificate, the second public key not including identification information that uniquely identifies one of the rights management terminal and a user using the rights management terminals,
   wherein in the case where the second public key certificate transmitted from said certificate pair transmission unit corresponds to the second public key certificate transmitted from the rights management terminal, said authentication unit is operable to authenticate that the rights management terminal is a valid terminal,
   wherein the server apparatus further comprises:
   a command transmission unit operable to transmit a command for causing the rights management terminal to transmit usage information held in the rights management terminal, in the case where the usage information is required, the usage information being related to a usage of the content used by the user; and
   a usage information collection unit operable to collect a usage history transmitted from the rights management terminal that is authenticated as a valid terminal.

16. A usage information collection system comprising: the rights management terminal according to claim 1; and a server apparatus that handles a license required by the rights management terminal that uses a content, said server apparatus comprising
   an authentication unit operable to authenticate the rights management terminal, using a public key certificate received from the rights management terminal for starting a data communication with the rights management terminal,
   wherein in the case where a second public key certificate is received from the rights management terminal, said authentication unit is operable to authenticate the rights management terminal by using the second public key certificate as an anonymous certificate, the second public key not including identification information that uniquely identifies one of the rights management terminal and a user using the rights management terminal.

17. A rights management method to be used for a rights management terminal that manages a copyright of a content by use of a license that includes a usage rule of the content, said method comprising:
   managing, as a set, a first public key certificate and a first private key, the first public key certificate including identification information that identifies at least one of the rights management terminal and a user using the rights management terminal, and the first private key being paired with a first public key included in the first public key certificate;
   managing, as a set, a second public key certificate and a second private key, the second public key not including the identification information, and the second private key being paired with a second public key included in the second public key certificate;
   selecting, as a set, (i) the second public key certificate and the second private key in the case where an execution command used during communication with a server apparatus indicates a transmission, to the server apparatus, of usage information related to a usage of the content used by the user, and (ii) the first public key certificate and the first private key in other cases; and
   executing authentication for communicating with the server apparatus, using the public key certificate and the private key which are selected as a set in said selecting,
   wherein the usage information is a usage history of the content.

18. A usage information collection method to be used by a server apparatus that handles a license required by a rights management terminal that uses a content, said method comprising:
   transmitting, from a certificate pair transmission unit to the rights management terminal, a set of a second public key certificate and a second private key paired with a second public key included in the second public key certificate; and
   authenticating, by an authentication unit, the rights management terminal, using a public key certificate received from the rights management terminal for starting a data communication with the rights management terminal,
   wherein in said authenticating, in the case where the second public key certificate is received from the rights management terminal, the rights management terminal is authenticated by using the second public key certificate as an anonymous certificate, the second public key not including identification information that uniquely identifies at least one of the rights management terminal and a user using the rights management terminal,
   wherein in the case where the second public key certificate transmitted from the certificate pair transmission unit corresponds to the second public key certificate transmitted from the rights management terminal, the authentication unit is operable to authenticate that the rights management terminal is a valid terminal, and
   wherein the method further comprises:
   transmitting a command for causing the rights management terminal to transmit usage information held in the rights management terminal, in the case where the usage information is required, the usage information being related to a usage of the content used by the user; and
   collecting a usage history transmitted from the rights management terminal that is authenticated as a valid terminal.

19. A computer-readable storage medium storing a program thereon, the program being used by a rights management terminal that manages a copyright of a content by use of a license that includes a usage rule of the content, said program causing a computer to execute a method comprising:

managing, as a set, a first public key certificate and a first private key, the first public key certificate not including identification information that identifies at least one of the rights management terminal and a user using the rights management terminal, and the first private key being paired with a first public key included in the first public key certificate;

managing, as a set, a second public key certificate and a second private key, the second public key not including the identification information, the second private key being paired with a second public key included in the second public key certificate;

selecting, as a set, (i) the second public key certificate and the second private key in the case where an execution command used during communication with a server apparatus indicates a transmission, to the server apparatus, of usage information related to a usage of the content used by the user, and (ii) the first public key certificate and the first private key in other cases; and executing authentication for communicating with the server apparatus, using the public key certificate and the private key which are selected as a set in said selecting, wherein the usage information is a usage history of the content.

20. A computer-readable storage medium storing a program thereon, the program being used by a server apparatus that handles a license required by a rights management terminal that uses a content, said program causing a computer to execute a method comprising:

transmitting, from a certificate pair transmission unit to the rights management terminal, a set of a second public key certificate and a second private key paired with a second public key included in the second public key certificate; and authenticating, by an authentication unit, the rights management terminal, using a public key certificate received from the rights management terminal for starting a data communication with the rights management terminal, wherein in said authenticating, in the case where the second public key certificate is received from the rights management terminal, the rights management terminal is authenticated using the second public key certificate as an anonymous certificate, the second public key certificate not including identification information that uniquely identifies at least one of the rights management terminal and a user using the rights management terminal, wherein in the case where the second public key certificate transmitted from the certificate pair transmission unit corresponds to the second public key certificate transmitted from the rights management terminal, the authentication unit is operable to authenticate that the rights management terminal is a valid terminal, wherein said program further causes the computer to execute:

transmitting a command for causing the rights management terminal to transmit usage information held in the rights management terminal, in the case where the usage information is required, the usage information being related to a usage of the content used by the user; and collecting a usage history transmitted from the rights management terminal that is authenticated as a valid terminal.

* * * * *

UNITED STATES PATENT AND TRADEMARK OFFICE
CERTIFICATE OF CORRECTION

| | | |
|---|---|---|
| PATENT NO. | : 7,571,488 B2 | Page 1 of 1 |
| APPLICATION NO. | : 11/093116 | |
| DATED | : August 4, 2009 | |
| INVENTOR(S) | : Masahiro Oho et al. | |

It is certified that error appears in the above-identified patent and that said Letters Patent is hereby corrected as shown below:

In column 21, claim 15, line 32, "the rights management terminals," should read --the rights management terminal,--.

Signed and Sealed this

Ninth Day of February, 2010

David J. Kappos
*Director of the United States Patent and Trademark Office*